(12) United States Patent
Fang et al.

(10) Patent No.: US 11,982,862 B1
(45) Date of Patent: May 14, 2024

(54) HEAD-MOUNTED DISPLAY DEVICE WITH STEPPER MOTORS FOR MOVING DISPLAYS

(71) Applicant: META PLATFORMS TECHNOLOGIES, LLC, Menlo Park, CA (US)

(72) Inventors: Joyce S Fang, Redmond, WA (US); Nicholas Colonnese, Kirkland, WA (US); Bruce A. Cleary, III, Bothell, WA (US); Ryan Michael Ebert, Issaquah, WA (US); Douglas Robert Lanman, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/954,234

(22) Filed: Sep. 27, 2022

Related U.S. Application Data

(63) Continuation of application No. 16/530,890, filed on Aug. 2, 2019, now Pat. No. 11,454,779.
(Continued)

(51) Int. Cl.
*G02B 7/04* (2021.01)
*G06F 3/01* (2006.01)

(52) U.S. Cl.
CPC .............. *G02B 7/04* (2013.01); *G06F 3/012* (2013.01); *G06F 3/013* (2013.01)

(58) Field of Classification Search
CPC ............ G06F 3/012; G06F 3/013; G02B 7/04
See application file for complete search history.

(56) References Cited

U.S. PATENT DOCUMENTS

| | | | |
|---|---|---|---|
| 5,134,326 | A | 7/1992 | Sakamoto |
| 5,880,711 | A | 3/1999 | Tamada |
| (Continued) | | | |

FOREIGN PATENT DOCUMENTS

| | | |
|---|---|---|
| CN | 201656741 U | 11/2010 |
| CN | 107340598 A | 11/2017 |

OTHER PUBLICATIONS

Final Office Action dated Dec. 15, 2021 for U.S. Appl. No. 17/104,962, filed Nov. 25, 2020, 23 pages.
(Continued)

*Primary Examiner* — Kenneth B Lee, Jr.
(74) *Attorney, Agent, or Firm* — Morgan, Lewis & Bockius LLP

(57) ABSTRACT

A head-mounted display device includes a first set of one or more lenses and a first display configured to provide visual data through the first set of one or more lenses. The head-mounted display device further includes a first stepper motor mechanically coupled to the first display, and the first stepper motor is configured to move the first display along a first axis by rotating a rotatable component of the first stepper motor. The head-mounted display device further includes a first electronic controller configured to (i) determine a first position of the first display, (ii) receive information identifying a second position of the first display, and
(Continued)

(iii) generate one or more electrical signals that cause the first stepper motor to move the first display from the first position to the second position along the first axis.

20 Claims, 14 Drawing Sheets

Related U.S. Application Data

(60) Provisional application No. 62/778,854, filed on Dec. 12, 2018.

(56) References Cited

U.S. PATENT DOCUMENTS

| | | | |
|---|---|---|---|
| 10,610,775 B1 * | 4/2020 | Ebert | G06F 3/013 |
| 10,701,350 B1 | 6/2020 | Ebert | |
| 10,871,627 B1 | 12/2020 | Fang et al. | |
| 10,901,205 B1 | 1/2021 | Lu et al. | |
| 11,454,779 B1 * | 9/2022 | Fang | G06F 3/013 |
| 2013/0088413 A1 | 4/2013 | Raffle et al. | |
| 2013/0169683 A1 | 7/2013 | Perez et al. | |
| 2013/0208193 A1 | 8/2013 | Wyllie | |
| 2014/0354515 A1 | 12/2014 | LaValle et al. | |
| 2015/0138645 A1 | 5/2015 | Yoo et al. | |
| 2016/0161833 A1 | 6/2016 | Watanabe et al. | |
| 2016/0313558 A1 | 10/2016 | Gutierrez | |
| 2017/0148215 A1 | 5/2017 | Aksoy et al. | |
| 2017/0160518 A1 | 6/2017 | Lanman et al. | |
| 2017/0160798 A1 | 6/2017 | Lanman et al. | |
| 2017/0161951 A1 | 6/2017 | Fix et al. | |
| 2017/0262054 A1 * | 9/2017 | Lanman | G02B 27/0172 |
| 2017/0269353 A1 | 9/2017 | Xu | |
| 2017/0293146 A1 | 10/2017 | Nicholls et al. | |
| 2017/0358136 A1 | 12/2017 | Gollier et al. | |
| 2018/0075653 A1 | 3/2018 | Schillings | |
| 2018/0203505 A1 | 7/2018 | Trail et al. | |
| 2018/0239145 A1 * | 8/2018 | Lanman | G06F 3/013 |
| 2019/0041643 A1 | 2/2019 | Chang et al. | |
| 2019/0282434 A1 | 9/2019 | Park | |
| 2019/0349576 A1 * | 11/2019 | Yildiz | G02B 27/0093 |
| 2019/0384378 A1 | 12/2019 | Ebert et al. | |
| 2020/0035206 A1 | 1/2020 | Hamaker et al. | |
| 2020/0051320 A1 | 2/2020 | Laffont et al. | |
| 2020/0064635 A1 | 2/2020 | Franklin et al. | |
| 2020/0174262 A1 | 6/2020 | Godar et al. | |
| 2020/0285062 A1 | 9/2020 | Grutman et al. | |
| 2020/0355206 A1 | 11/2020 | Aerts et al. | |

OTHER PUBLICATIONS

Final Office Action dated Sep. 16, 2022 for U.S. Appl. No. 17/104,962, filed Nov. 25, 2020, 31 pages.
Non-Final Office Action dated Jun. 2, 2020 for U.S. Appl. No. 16/530,896, filed Aug. 2, 2019, 22 pages.
Non-Final Office Action dated Feb. 3, 2022 for U.S. Appl. No. 16/530,890, filed Aug. 2, 2019, 11 pages.
Non-Final Office Action dated Sep. 7, 2021 for U.S. Appl. No. 17/104,962 , filed Nov. 25, 2020, 23 pages.
Non-Final Office Action dated Jun. 13, 2022 for U.S. Appl. No. 17/104,962, filed Nov. 25, 2020, 29 pages.
Non-Final Office Action dated Sep. 17, 2020 for U.S. Appl. No. 16/530,893, filed Aug. 2, 2019, 17 pages.
Non-Final Office Action dated Dec. 23, 2022 for U.S. Appl. No. 17/323,701, filed May 18, 2021, 13 pages.
Non-Final Office Action dated Oct. 7, 2022 for U.S. Appl. No. 17/219,294, filed Mar. 31, 2021, 19 pages.
Notice of Allowance dated Aug. 11, 2020 for U.S. Appl. No. 16/530,896, filed Aug. 2, 2019, 7 pages.
Notice of Allowance dated Jan. 13, 2021 for U.S. Appl. No. 16/530,893, filed Aug. 2, 2019, 8 pages.
Notice of Allowance dated Feb. 18, 2021 for U.S. Appl. No. 16/530,892, filed Aug. 2, 2019, 10 pages.
Notice of Allowance dated May 18, 2022 for U.S. Appl. No. 16/530,890, filed Aug. 2, 2019, 5 pages.
Notice of Allowance dated Aug. 31, 2022 for U.S. Appl. No. 16/530,890, filed Aug. 2, 2019, 2 pages.
Restriction Requirement dated Jun. 25, 2021 for U.S. Appl. No. 17/104,962, filed Nov. 25, 2020, 7 Pages.
Final Office Action dated Mar. 6, 2023 for U.S. Appl. No. 17/219,294, filed Mar. 31, 2021,21 pages.
Notice of Allowance dated Apr. 3, 2023 for U.S. Appl. No. 17/323,701, filed May 18, 2021, 9 pages.
Notice of Allowance dated Mar. 15, 2023 for U.S. Appl. No. 17/104,962, filed Nov. 25, 2020, 8 pages.
Notice of Allowance dated Jun. 14, 2023 for U.S. Appl. No. 17/104,962, filed Nov. 25, 2020, 3 pages.
Non-Final Office Action mailed Sep. 29, 2023 for U.S. Appl. No. 17/219,294, filed Mar. 31, 2021, 23 pages.
Notice of Allowance mailed Jul. 26, 2023 for U.S. Appl. No. 17/323,701, filed May 18, 2021,2 pages.

* cited by examiner (Frame n)

(Frame n+1)

Frame n+1

Frame n+2

900

| F | 0 | | 1 | | 2 | | 3 | |
|---|---|---|---|---|---|---|---|---|
| H | 0 | 1 | 2 | 3 | 4 | 5 | 6 | 7 |
| A | 1 | 0 | 0 | 0 | 0 | 0 | 1 | 1 |
| B | 1 | 1 | 1 | 0 | 0 | 0 | 0 | 0 |
| A\ | 0 | 0 | 1 | 1 | 1 | 0 | 0 | 0 |
| B\ | 0 | 0 | 0 | 0 | 1 | 1 | 1 | 0 |
| dez | 12 | 4 | 6 | 2 | 3 | 1 | 9 | 8 |

| | | | | | | | | |
|---|---|---|---|---|---|---|---|---|
| current A in % | 71 | 55 | 40 | 20 | 0 | 20 | 40 | 55 |
| current B in % | 71 | 83 | 91 | 100 | 100 | 100 | 91 | 83 |
| $A_H A_L$ | 1 | 1 | 1 | 1 | 0 | 0 | 0 | 0 |
| $B_H B_L$ | 1 | 1 | 1 | 1 | 1 | 1 | 1 | 1 |
| $A\backslash_H A\backslash_L$ | 0 | 0 | 0 | 0 | 0 | 1 | 1 | 1 |
| $B\backslash_H B\backslash_L$ | 0 | 0 | 0 | 0 | 0 | 0 | 0 | 0 |
| Clock | 0 | 1 | 2 | 3 | 4 | 5 | 6 | 7 |

Figure 9B

HEAD-MOUNTED DISPLAY DEVICE WITH STEPPER MOTORS FOR MOVING DISPLAYS

RELATED APPLICATIONS

This application is a continuation of U.S. patent application Ser. No. 16/530,890, filed Aug. 2, 2019, which claims the benefit of, and priority to, U.S. Provisional Patent Application 62/778,854, entitled "Head-Mounted Display Device with Stepper Motors for Moving Displays" filed Dec. 12, 2018, each of which is incorporated by reference herein in its entirety. This application is related to U.S. patent application Ser. No. 16/530,892, now U.S. Pat. No. 11,042,187, entitled "Head-Mounted Display Device with Voice Coil Motors for Moving Displays" filed on Aug. 2, 2019, U.S. patent application Ser. No. 16/530,893, now U.S. Pat. No. 11,009,713, entitled "Head-Mounted Display Device with Voice Coil Motors for Moving Displays" filed on Aug. 2, 2019, and U.S. patent application Ser. No. 16/530,896, now U.S. Pat. No. 10,871,627, entitled "Head-Mounted Display Device with Direct-Current (DC) Motors for Moving Displays" filed on Aug. 2, 2019, all of which are incorporated by reference herein in their entireties.

TECHNICAL FIELD

The present disclosure generally relates to enhancing head-mounted display devices, and specifically to an actuator (e.g., one or more stepper motors) for adjusting a focal plane of projected images and control methods for the actuator.

BACKGROUND

A head mounted display (HMD) can be used to simulate virtual environments. For example, stereoscopic images are displayed on a display inside the HMD to simulate the illusion of depth, and head tracking sensors estimate what portion of the virtual environment is being viewed by the user. However, conventional HMDs are often unable to compensate for vergence and accommodation conflicts when rendering content, which may cause visual fatigue and nausea in users.

SUMMARY

One solution to the problem includes providing a head-mounted display device that uses one or more stepper motors to move one or more displays of the head-mounted display device. By moving the one or more displays, focal planes are adjusted, thereby reducing, alleviating, or eliminating the vergence and accommodation conflicts. The one or more stepper motors are capable of moving the displays rapidly and quietly, thereby enhancing the user experience with the simulated virtual (or augmented) environment.

In accordance with some embodiments, a head-mounted display device includes a first set of one or more lenses and a first display configured to provide visual data through the first set of one or more lenses. The head-mounted display device also includes a first stepper motor mechanically coupled to the first display and/or the first set of one or more lenses. The first stepper motor is configured to move the first display and/or the first set of one or more lenses along a first axis by rotating a rotatable component of the first stepper motor. The head-mounted display device further includes a first electronic controller configured to (i) determine a first position of the first display and/or the first set of one or more lenses, (ii) receive information identifying a second position of the first display and/or the first set of one or more lenses, and (iii) generate one or more electrical signals that cause the first stepper motor to move the first display and/or the first set of one or more lenses from the first position to the second position along the first axis.

In accordance with some embodiments, a head-mounted display device includes a first set of one or more lenses and a first display configured to provide visual data through the first set of one or more lenses. The head-mounted display device also includes a first stepper motor mechanically coupled to the first display. The first stepper motor is configured to move the first display along a first axis by rotating a rotatable component of the first stepper motor. The head-mounted display device further includes a first electronic controller configured to (i) determine a first position of the first display, (ii) receive information identifying a second position of the first display, and (iii) generate one or more electrical signals that cause the first stepper motor to move the first display from the first position to the second position along the first axis without moving the first set of one or more lenses.

In accordance with some embodiments, a head-mounted display device includes a first set of one or more lenses and a first display configured to provide visual data through the first set of one or more lenses. The head-mounted display device also includes a first stepper motor mechanically coupled to the first set of one or more lenses. The first stepper motor is configured to move the first set of one or more lenses along a first axis by rotating a rotatable component of the first stepper motor. The head-mounted display device further includes a first electronic controller configured to (i) determine a first position of the first set of one or more lenses, (ii) receive information identifying a second position of the first set of one or more lenses, and (iii) generate one or more electrical signals that cause the first stepper motor to move the first set of one or more lenses from the first position to the second position along the first axis without moving the first display.

In accordance with some embodiments, a method performed at a first electronic controller of a head-mounted display device includes determining a first position of a first display and/or a first set of one or more lenses of the head-mounted display device and receiving information identifying a second position of the first display and/or the first set of one or more lenses. The method also includes generating one or more electrical signals that cause a first stepper motor of the head-mounted display device to move the first display and/or the first set of one or more lenses from the first position to the second position. In some embodiments, the first stepper motor is mechanically coupled to the first display and/or the first set of one or more lenses via a rotatable component of the first stepper motor.

In accordance with some embodiments, a first electronic controller configured for use in a head-mounted display device includes one or more processors/cores; and memory storing one or more programs for execution by the one or more processors/cores. The one or more programs include instructions for: determining a first position of a first display and/or a first set of one or more lenses of the head-mounted display device; receiving information identifying a second position of the first display and/or the first set of one or more lenses; and generating one or more electrical signals that cause a first stepper motor of the head-mounted display device to move the first display and/or the first set of one or more lenses from the first position to the second position. In some embodiments, the first stepper motor is mechanically coupled to the first display and/or the first set of one or more lenses via a rotatable component of the first stepper motor.

In accordance with some embodiments, a head-mounted display device includes one or more processors/cores and memory storing one or more programs configured to be executed by the one or more processors/cores. The one or more programs include instructions for performing the operations of any of the methods described herein. In accordance with some embodiments, a non-transitory computer-readable storage medium stores therein instructions that, when executed by one or more processors/cores of a head-mounted display device, cause the device to perform the operations of any of the methods described herein.

In another aspect, a head-mounted display device is provided and the head-mounted display device includes means for performing any of the methods described herein.

Thus, the disclosed embodiments provide a head-mounted display device with at least one stepper motor to move a display of the head-mounted display device.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures and specification.

FIGS. 9A-9B illustrate example lookup tables that are used for controlling operation of a stepper motor in accordance with some embodiments.

Figure 1:
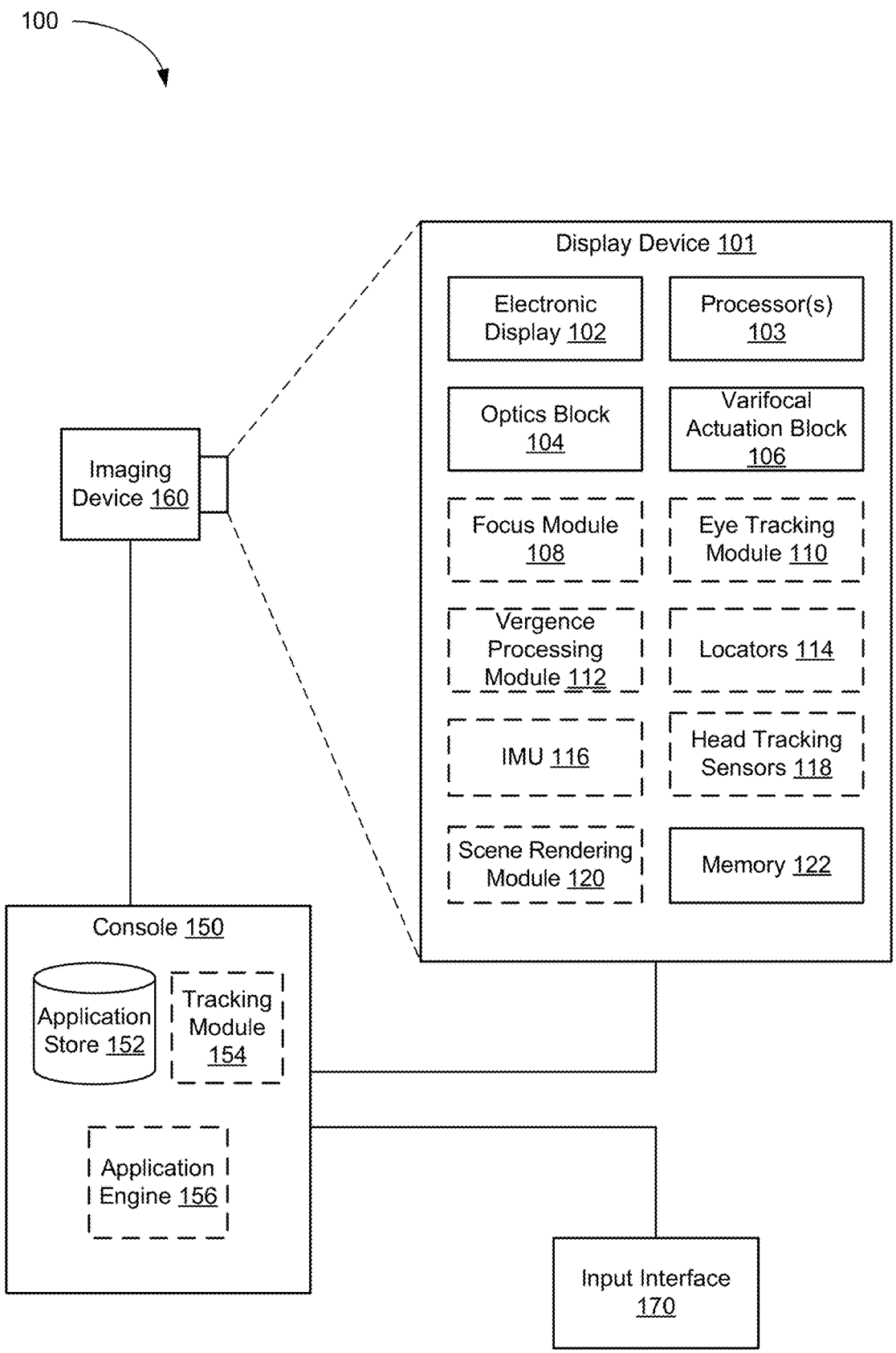
FIG. 1 is a block diagram illustrating an example system in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first stepper motor could be termed a second stepper motor, and, similarly, a second stepper motor could be termed a first stepper motor, without departing from the scope of the various described embodiments. The first stepper motor and the second stepper motor are both stepper motors, but they are not the same stepper motor, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

A varifocal system provides dynamic adjustment of a focal plane of a head-mounted display device to keep a user's eyes in a zone of comfort as vergence and accommodation change. In some embodiments, the system uses an eye tracker to determine a gaze direction of the user and moves one or more optical components (e.g., a lens and/or an electronic display) to ensure that the displayed image is located at a focal plane that corresponds to the determined gaze direction. The system, in some embodiments, physically moves an electronic display, an optical block, or both using various actuation devices, control system, and position sensing mechanisms described herein.

FIG. 1 is a block diagram illustrating system 100 in accordance with some embodiments. System 100 shown in FIG. 1 includes display device 101, imaging device 160, and input interface 170. In some embodiments, all of display device 101, imaging device 160, and input interface 170 are coupled to console 150.

Embodiments of system 100 may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

While FIG. 1 shows single display device 101, single imaging device 160, and single input interface 170, in some other embodiments, any number of these components may be included in the system. For example, there may be multiple display devices each having associated input interface 170 and being monitored by one or more imaging devices 160, with each display device 101, input interface 170, and imaging device 160 communicating with console 150. In alternative configurations, different and/or additional components may also be included in the system environment.

In some embodiments, display device 101 is a head-mounted display that presents media to a user of display device 101. Display device 101 is also referred to herein as a head-mounted display device. Examples of media presented by display device 101 include one or more of images, video, audio, haptics, or some combination thereof. In some embodiments, audio is presented via an external device (e.g., speakers and/or headphones) that receives audio information from display device 101, console 150, or both, and presents audio data based on the audio information. In some embodiments, display device 101 immerses a user in a virtual environment.

In some embodiments, display device 101 also acts as an augmented reality (AR) headset. In these embodiments, display device 101 augments views of a physical, real-world environment with computer-generated elements (e.g., images, video, sound, etc.). Moreover, in some embodiments, display device 101 is able to cycle between different types of operation. Thus, display device 101 operates as a virtual reality (VR) device, an AR device, as glasses or some combination thereof (e.g., glasses with no optical correction, glasses optically corrected for the user, sunglasses, or some combination thereof) based on instructions from application engine 156.

In some embodiments, display device 101 includes one or more of each of the following: display 102, processor 103, optics block 104, varifocal actuation block 106, focus prediction module 108, eye tracking module 110, vergence processing module 112, locators 114, inertial measurement unit (IMU) 116, head tracking sensors 118, scene rendering module 120, and memory 122. In some embodiments, display device 101 includes only a subset of the modules described here. In some embodiments, display device 101 has different modules than those described here. Similarly, the functions can be distributed among the modules in a different manner than is described here.

One or more processors 103 (e.g., processing units or cores) execute instructions stored in memory 122. Memory 122 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 122, or alternately the non-volatile memory device(s) within memory 122, includes a non-transitory computer readable storage medium. In some embodiments, memory 122 or the computer readable storage medium of memory 122 stores programs, modules and data structures, and/or instructions for displaying one or more images on display 102.

Display 102 displays images to the user in accordance with data received from console 150 and/or processor(s) 103. In various embodiments, display 102 comprises a single adjustable display element or multiple adjustable displays elements (e.g., a display for each eye of a user).

Optics block 104 directs light from display 102 to an exit pupil, for viewing by a user, using one or more optical elements, such as Fresnel lenses, convex lenses, concave lenses, filters, and so forth, and may include combinations of different optical elements. Optics block 104 typically includes one or more lenses. In some embodiments, when display 102 includes multiple adjustable display elements, optics block 104 may include multiple optics blocks 104 (one for each adjustable display element).

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to display 102 for display is pre-distorted, and optics block 104 corrects the distortion when it receives image light from display 102 generated based on the content.

Varifocal actuation block 106 is configured to move display 102 and/or components of optics block 104 to vary the focal plane of display device 101. In doing so, varifocal actuation block 106 keeps a user's eyes in a zone of comfort as vergence and accommodation change. In some embodiments, varifocal actuation block 106 physically changes the distance between display 102 and optics block 104 by moving display 102 or optics block 104 (or both), as will be explained further with respect to FIGS. 4C-4D. Additionally, moving or translating two lenses of optics block 104 relative to each other may also be used to change the focal plane of display device 101. Thus, varifocal actuation block 106 may include actuators or motors (e.g., stepper motor 602, FIG. 6A) that are configured to move display 102 and/or optics block 104 to change the distance between them. Varifocal actuation block 106 may be separate from or integrated into optics block 104 in various embodiments.

Each state of optics block 104 corresponds to a particular location of a focal plane of display device 101. In some embodiments, optics block 104 moves in a range of 5~10 mm with a positional accuracy of 5~10 μm. This can lead to 1000 states (e.g., positions) of optics block 104. Any number of states could be provided. In some embodiments, fewer states are used. For example, in some cases, a first state corresponds to a focal plane located at infinity, a second state corresponds to a focal plane located at 2.0 meters (from a reference plane), a third state corresponds to a focal plane located at 1.0 meter, a fourth state corresponds to a focal plane located at 0.5 meter, a fifth state corresponds to a focal plane located at 0.333 meter, and a sixth state corresponds to a focal plane located at 0.250 meter. Varifocal actuation block 106, thus, sets and changes the state of optics block 104 to achieve a desired location of a focal plane.

Optional focus prediction module 108 includes logic that tracks the position or state of optics block 104 and/or display 102 to predict to one or more future states or locations of optics block 104 and/or display 102. In some embodiments, focus prediction module 108 accumulates historical information corresponding to previous states of optics block 104 and predicts a future state of optics block 104 based on the previous states. Because rendering of a virtual scene by display device 101 is adjusted, at least in some embodiments, based on the state of optics block 104, the predicted state allows scene rendering module 120 to determine an adjustment to apply to the virtual scene for a particular frame.

Optional eye tracking module 110 tracks an eye position and/or eye movement of a user of display device 101. In some embodiments, a camera or other optical sensor (typically located inside display device 101) captures image information of a user's eyes, and eye tracking module 110 uses the captured information to determine interpupillary distance, interocular distance, a three-dimensional (3D) position of each eye relative to display device 101 (e.g., for distortion adjustment purposes), including a magnitude of torsion and rotation (i.e., roll, pitch, and yaw) and gaze directions for each eye. In one example, infrared light is emitted within display device 101 and reflected from each eye. The reflected light is received or detected by the camera (or sensor) and analyzed to extract eye rotation information from changes in the infrared light reflected by each eye. Many methods for tracking the eyes of a user can be used by eye tracking module 110. Accordingly, eye tracking module 110 may track up to six degrees of freedom of each eye (e.g., three-dimensional position, roll, pitch, and yaw) and at least a subset of the tracked quantities may be combined from two eyes of a user to estimate a gaze point (e.g., a three-dimensional location or position in the virtual scene where the user is looking).

Optional vergence processing module 112 determines a vergence depth of a user's gaze based on the gaze point or an intersection of gaze lines determined by eye tracking module 110. Vergence is the simultaneous movement or rotation of both eyes in opposite directions to maintain single binocular vision, which is naturally and automatically performed by the human eye. Thus, a location where gaze directions of a user's eyes intersect each other is where the user is looking. The gaze location is typically located on a focal plane of the user's eyes (e.g., the plane where the user's eyes are, or should be, focused). In some embodiments, vergence processing module 112 triangulates gaze lines (that correspond to the gaze directions of the user's eyes) to determine a vergence distance or depth from the user. The depth associated with intersection of the gaze lines can then be used as an approximation for the accommodation distance, which identifies a distance from the user where the user's eyes are (or should be) focused. Thus, the vergence distance allows determination of a location where the user's eyes should be focused (and a distance from the user's eyes to the determined location), thereby providing information, such as a location of an object or a focal plane, used for adjusting the virtual scene.

Optional locators 114 are objects located in specific positions on display device 101 relative to one another and relative to a specific reference point on display device 101. Locator 114 may be a light emitting diode (LED), a corner cube reflector, a reflective marker, a type of light source that contrasts with an environment in which display device 101 operates, or some combination thereof. In some embodiments, locators 114 include active locators (e.g., an LED or other type of light emitting device) configured to emit light in the visible band (e.g., about 400 nm to 750 nm), in the infrared (IR) band (e.g., about 750 nm to 1 mm), in the ultraviolet band (e.g., about 100 nm to 400 nm), some other portion of the electromagnetic spectrum, or some combination thereof.

In some embodiments, locators 114 are located beneath an outer surface of display device 101, which is transparent to the wavelengths of light emitted or reflected by locators 114 or is thin enough to not substantially attenuate the wavelengths of light emitted or reflected by locators 114. Additionally, in some embodiments, the outer surface or other portions of display device 101 are opaque in the visible band of wavelengths of light. Thus, locators 114 may emit light in the IR band under an outer surface that is transparent in the IR band but opaque in the visible band.

Optional inertial measurement unit (IMU) 116 is an electronic device that generates first calibration data based on measurement signals received from one or more head tracking sensors 118. One or more head tracking sensors 118 generate one or more measurement signals in response to motion of display device 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates first calibration data indicating an estimated position of display device 101 relative to an initial position of display device 101. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of display device 101 from the sampled data. For example, IMU 116 integrates the measurement signals received from the accelerometers over time to estimate a velocity vector and integrates the velocity vector over time to determine an estimated position of a reference point on display device 101. Alternatively, IMU 116 provides the sampled measurement signals to console 150, which determines the first calibration data. The reference point is a point that may be used to describe the position of display device 101. While the reference point may generally be defined as a point in space; however, in practice the reference point is defined as a point within display device 101 (e.g., a center of IMU 116).

In some embodiments, IMU 116 receives one or more calibration parameters from console 150. As further discussed below, the one or more calibration parameters are used to maintain tracking of display device 101. Based on a received calibration parameter, IMU 116 may adjust one or more IMU parameters (e.g., sample rate). In some embodiments, certain calibration parameters cause IMU 116 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Optional scene rendering module 120 receives content for the virtual scene from application engine 156 and provides the content for display on display 102. Additionally, scene rendering module 120 can adjust the content based on information from focus prediction module 108, vergence processing module 112, IMU 116, and/or head tracking sensors 118. For example, upon receiving the content from engine 156, scene rendering module 120 adjusts the content based on the predicted state (e.g., a state that corresponds to a particular eye position) of optics block 104 received from focus prediction module 108 by adding a correction or pre-distortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., three-dimensional position of the eye, etc.). Additionally, scene rendering module 120 determines a portion of the content to be displayed on display 102 based on one or more of tracking module 154, head tracking sensors 118, or IMU 116, as described further below.

Imaging device 160 generates second calibration data in accordance with calibration parameters received from console 150. The second calibration data includes one or more images showing observed positions of locators 114 that are detectable by imaging device 160. In some embodiments, imaging device 160 includes one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. The second calibration data is communicated from imaging device 160 to console 150, and imaging device 160 receives one or more calibration parameters from console 150 to adjust one or more imaging parameters (e.g., focal length, focus, frame rate, ISO, sensor temperature, shutter speed, aperture, etc.).

Input interface 170 is a device that allows a user to send action requests to console 150. An action request is a request to perform a particular action. For example, an action request may be to start or end an application or to perform a particular action within the application. Input interface 170 may include one or more input devices. Example input devices include a keyboard, a mouse, a game controller, or any other suitable device for receiving action requests and communicating the received action requests to console 150. An action request received by input interface 170 is communicated to console 150, which performs an action corresponding to the action request. In some embodiments, input interface 170 may provide haptic feedback to the user in accordance with instructions received from console 150. For example, haptic feedback is provided by input interface 170 when an action request is received, or console 150 communicates instructions to input interface 170 causing input interface 170 to generate haptic feedback when console 150 performs an action.

Console 150 provides media to display device 101 for presentation to the user in accordance with information received from imaging device 160, display device 101, and/or input interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

When application store 152 is included in console 150, application store 152 stores one or more applications for execution by console 150. An application is a group of instructions, that, when executed by a processor (e.g., processors 103), is used for generating content for presentation to the user. Content generated by the processor based on an application may be in response to inputs received from the user via movement of display device 101 or input interface 170. Examples of applications include gaming applications, conferencing applications, video playback application, or other suitable applications.

When tracking module 154 is included in console 150, the tracking module 154 calibrates system 100 using one or more calibration parameters and may adjust one or more calibration parameters to reduce error in determination of the position of display device 101. For example, tracking module 154 adjusts the focus of imaging device 160 to obtain a more accurate position for observed locators 114 on display device 101. Moreover, calibration performed by tracking module 154 also accounts for information received from IMU 116. Additionally, if tracking of display device 101 is lost (e.g., imaging device 160 loses line of sight of at least a threshold number of locators 114), tracking module 154 re-calibrates some or all of the system components.

In some embodiments, tracking module 154 tracks the movement of display device 101 using calibration data from imaging device 160. For example, tracking module 154 determines positions of a reference point on display device 101 using observed locators from the calibration data from imaging device 160 and a model of display device 101. In some embodiments, tracking module 154 also determines positions of the reference point on display device 101 using position information from the calibration data from IMU 116 on display device 101. Additionally, in some embodiments, tracking module 154 use portions of the first calibration data, the second calibration data, or some combination thereof, to predict a future location of display device 101. Tracking module 154 provides the estimated or predicted future position of display device 101 to application engine 156.

Application engine 156 executes applications within system 100 and receives position information, acceleration information, velocity information, predicted future positions, or some combination thereof for display device 101 from tracking module 154. Based on the received information, application engine 156 determines content to provide to display device 101 for presentation to the user, such as a virtual scene. For example, if the received information indicates that the user has looked to the left, application engine 156 generates content for display device 101 that mirrors or tracks the user's movement in a virtual environment. Additionally, application engine 156 performs an action within an application executing on console 150 in response to an action request received from input interface 170 and provides feedback to the user that the action was performed. The provided feedback may be visual or audible feedback via display device 101 or haptic feedback via input interface 170.

Figure 2:
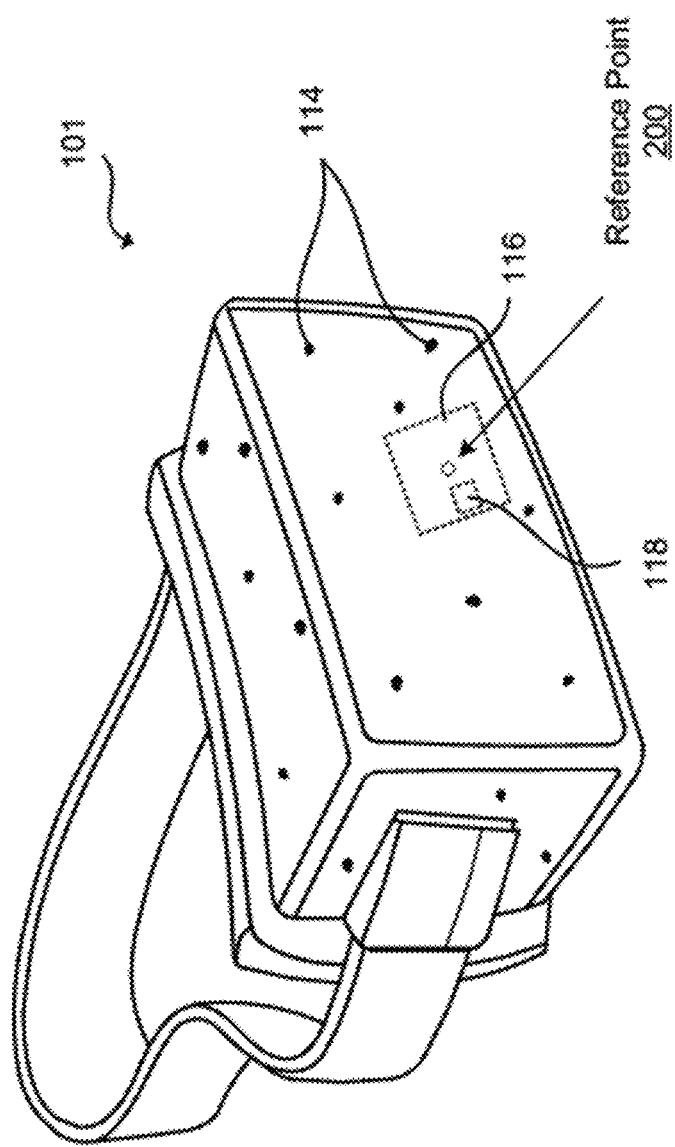
FIG. 2 illustrates a head-mounted display device in accordance with some embodiments.

FIG. 2 illustrates head-mounted display device 101 in accordance with some embodiments. In this example, display device 101 includes a front rigid body and a band that goes around a user's head. The front rigid body includes one or more display elements corresponding to display 102, IMU 116, head tracking sensors 118, and locators 114. In this example, head tracking sensors 118 are located within IMU 116. Note in some embodiments, where the display device 101 is used in AR and/or MR applications, portions of the display device 101 may be at least partially transparent (e.g., an internal display, one or more sides of the display device 101, etc.).

In the example provided, locators 114 are located in fixed positions on the front rigid body relative to one another and relative to reference point 200. In this example, reference point 200 is located at the center of IMU 116. Each of locators 114 emits light that is detectable by imaging device 160. Locators 114, or portions of locators 114, are located on a front side, a top side, a bottom side, a right side, and a left side of the front rigid body, as shown FIG. 2.

Focal Plane Adjustment Method

As discussed above, system 100 may dynamically vary the focal plane to bring images presented to a user wearing display device 101 into focus, which keeps the user's eyes in a zone of comfort as vergence and accommodation change. Additionally, eye tracking in combination with the variable focus of the varifocal system allows blurring to be introduced in images presented by display device 101.

Accordingly, a position, orientation, and/or a movement of display device 101 is determined by a combination of locators 114, IMU 116, head tracking sensors 118, imaging device 160, and tracking module 154, as described above in conjunction with FIG. 1. Portions of a virtual scene presented by display device 101 are mapped to various positions and orientations of display device 101. Thus, a portion of the virtual scene currently viewed by a user is determined based on the position, orientation, and movement of display device 101. After determining the portion of the virtual scene being viewed by the user, the system 100 may then determine a location or an object within the determined portion at which the user is looking to adjust focus for that location or object accordingly.

To determine the location or object within the determined portion of the virtual scene at which the user is looking, display device 101 tracks the position and/or location of the user's eyes. Thus, in some embodiments, display device 101 determines an eye position for each eye of the user. For example, display device 101 tracks at least a subset of the three-dimensional position, roll, pitch, and yaw of each eye and uses these quantities/measurements to estimate a three-dimensional gaze point of each eye. Further, information from past eye positions, information describing a position of the user's head, and information describing a scene presented to the user may also be used to estimate the three-dimensional gaze point of an eye in various embodiments.

Figure 3:
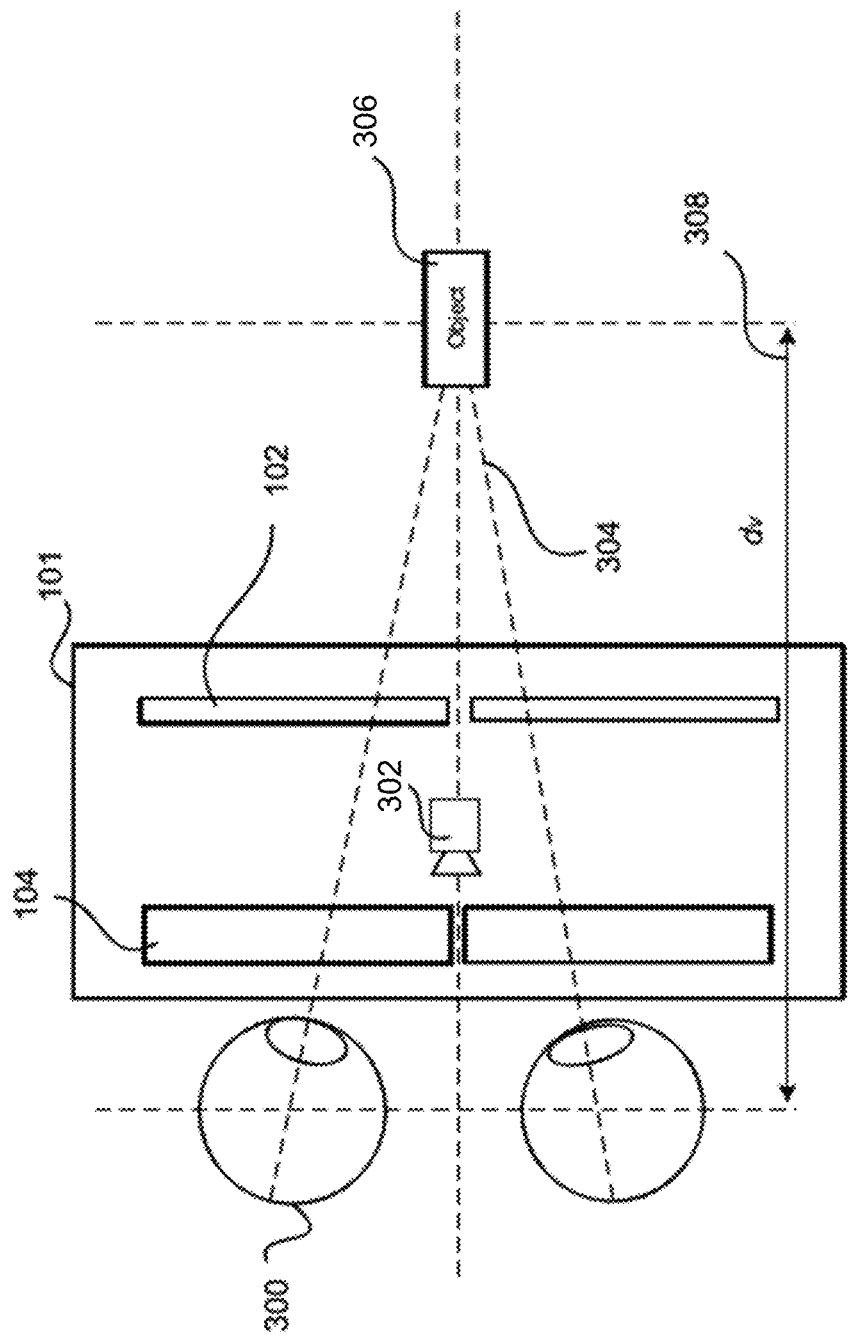
FIG. 3 is a schematic diagram illustrating a head-mounted display device that includes a camera for tracking eye position in accordance with some embodiments.

FIG. 3 is a schematic diagram illustrating display device 101 that includes camera 302 for tracking the position of each eye 300. In this example, camera 302 captures images of the user's eyes and eye tracking module 110 determines, based on the captured images, a position and/or location of each eye 300 and gaze lines 304 corresponding to the gaze point or location where the user is looking.

Vergence depth (dv) 308 of the gaze point for the user is determined based on an estimated intersection of gaze lines 304. In FIG. 3, gaze lines 304 converge or intersect at a location where (real or virtual) object 306 is located. The convergence location is on a plane located at a distance corresponding to vergence depth 308 from eyes 300. Because (virtual) distances from the viewer to (virtual) objects within the virtual scene are known to the system, in some embodiments, vergence depth 308 can be filtered or verified to determine a more accurate vergence depth for the virtual scene. For example, vergence depth 308 is an approximation of the intersection of gaze lines 304, which are themselves an approximation based on the position of a user's eyes 300. Gaze lines 304 do not always precisely intersect each other. Thus, in some embodiments, virtual distances within the virtual scene are compared to the vergence depth for the portion of the virtual scene to generate a filtered vergence depth. In some embodiments, locations, on gaze lines 304, that have the shortest distance to each other are used to determine an estimated vergence depth.

Determining a more accurate vergence depth or gaze point enables the virtual scene to determine a user's object or plane of focus more accurately, allowing scene rendering module 120 to add depth of field blur to objects in the virtual scene or otherwise modify to virtual scene to appear more realistic. Further, if virtual scene includes multiple objects, vergence processing module 112 may compare the estimated vergence depth to distances associated with at least a subset of the objects to determine accuracy of the estimated vergence depth. In some embodiments, the device selects a particular vergence depth, of the vergence depths corresponding to the displayed objects, that is closest to the estimated vergence depth as a filtered vergence depth; however, other methods of identifying a filtered vergence depth (or an object that corresponds to the filtered vergence depth) may be used in various embodiments.

In some embodiments, a state of optics block 104 is determined for a frame of the virtual scene based on states of optics block 140 during presentation of previous frames of the virtual scene. For example, focus prediction module 108 tracks the state of optics block 104 for various frames of the virtual scene to predict a future state of optics block 104 for subsequent frames of the virtual scene. The predicted state of optics block 104 (e.g., a predicted location of optics block 104) allows the scene rendering module 120 to determine an adjustment to apply to a frame of the virtual scene so that distortion caused by the predicted state of optics block 104 corrects or cancels the applied adjustment rather than distorting the frame. Thus, based on the state of optics block 104, a distortion correction may be determined for application to a frame of the virtual scene to correct optical error introduced by the state of optics block 104.

Accordingly, the focal plane is adjusted for the presented frame of the virtual scene by moving one of display 102 or optics block 104 (or both) to provide the filtered vergence depth. In some embodiments, console 150 receives the necessary information from components and modules of display device 101, and determines where, how far, and how fast to move display 102 and/or optics block 104. Alternatively or additionally, in some embodiments, one or more processors 103 of display device 101 process the information gathered by components and modules of display device 101, and determine where, how far, and how fast to move display 102 and/or optics block 104.

FIGS. 4A-4D show examples of adjusting the focal plane by moving display 102 and/or optics block 104 using varifocal actuation block 106 in accordance with some embodiments. In FIGS. 4A-4D, varifocal actuation block 106 includes an actuator (e.g., motor), track, and so forth that will be further described with respect to FIGS. 5A-10 that allow movement of display 102, optics block 104, or both for dynamically adjusting a focal plane.

Figure 4A:
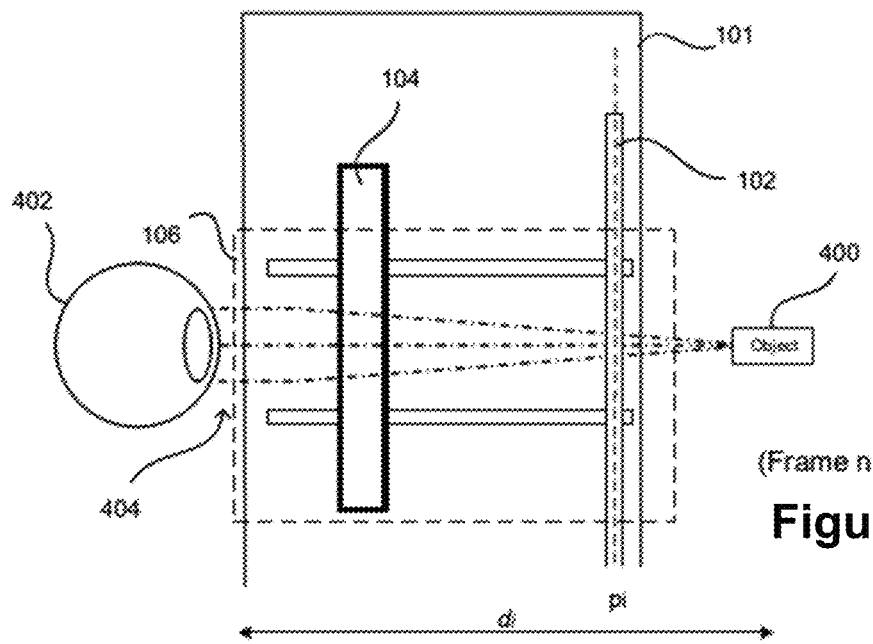
FIGS. 4A-4D show examples of adjusting a focal plane by moving a display screen and/or an optics block using a varifocal actuation block in accordance with some embodiments.

FIG. 4A shows an example of display device 101 providing focal plane adjustment for frame n of a scene. In this example, the scene includes object 400, displayed on display 102, at which the gaze of user 402 is directed (e.g., verged). A virtual image of object 400 is located at a virtual distance di, behind display 102, from exit pupil 404. In the example of FIG. 4A, display 102 is in position $p_i$, which provides accommodation for distance di to enable comfortable viewing of object 400.

Figure 4B:
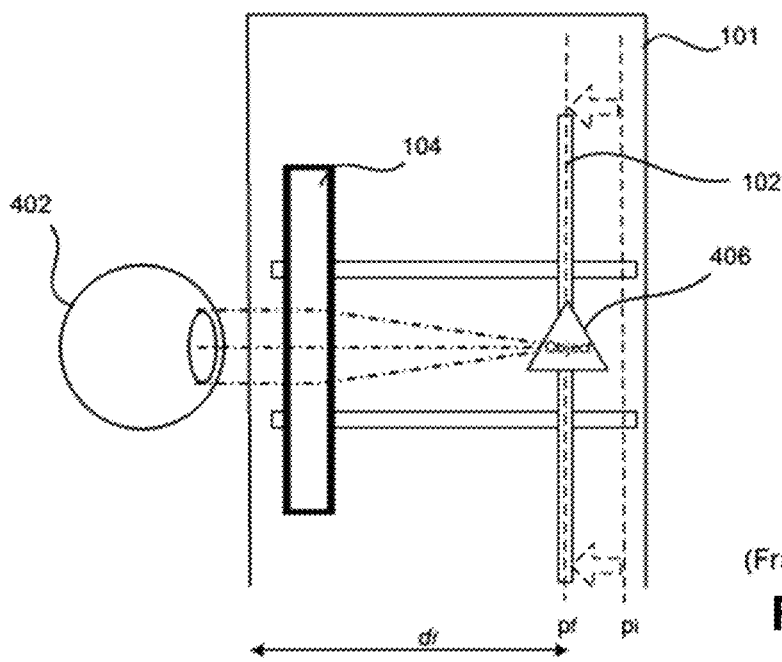

FIG. 4B shows display device 101 providing focal plane adjustment for a subsequent frame n+1 of the virtual scene. In this example, user 402 may have repositioned his/her eyes to look at object 406 or object 406 quickly moved toward user 402 in the scene. As a result, the virtual image of object 406 is located close to display 102. In response to the location of object 406 being close to the display 102, which is closer than object 400 in FIG. 4A, eyes of user 402 rotate inward to verge on object 406, causing vergence processing module 112 to determine a new vergence depth for frame n+1 and to provide the new vergence depth to varifocal actuation block 106. Based on the new vergence depth, varifocal actuation block 106 moves display 102 from position $p_i$ to new position $p_f$ to accommodate user 402 at the new vergence depth $d_f$ for the closer object 406.

In some embodiments, each state of optics block 104 corresponds to a combination of a particular focal distance and a particular eye position. In some examples, optics block 104 is configured to provide accommodation for a range of vergence depths. In some embodiments, each state of optics block 104 is associated with a specific position of optics block 104. Accordingly, vergence depths may be mapped to positions of optics block 104, and, in some cases, the mapping information can be stored in a table (e.g., a lookup table). Thus, in some embodiments, when a vergence depth is received from vergence processing module 112, varifocal actuation block 106 moves optics block 104 to a position corresponding to the received vergence depth based on the lookup table.

In many instances, virtual reality systems aim to present users with a virtual environment that simulates a real world environment, causing the users to get immersed in the environment presented by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a HMD to catch up to what the user's brain is already expecting, the quality of the immersive experience is reduced.

In some embodiments, the frame of the virtual scene corresponding to the portion of the virtual scene being viewed by the user is displayed on display 102 with a distortion correction to correct optical error caused by optics block 104 based on the determined state of optics block 104 and a depth of field blur based on the vergence depth. Further, varifocal actuation block 106 has changed the focus of optics block 104 to provide focus and accommodation to the location in the portion of the virtual scene where the user's eyes are verged.

In some embodiments, display of a scene by display device 101 is modified to mitigate distortion introduced by optical errors of optics block 104 included in display device 101 that directs image light from display element 102 presenting the scene to an eye of a user. A distortion correction is applied to the scene that pre-distorts the scene, and distortion caused by optics block 140 compensates for the pre-distortion as light from the modified scene passes through optics block 104 (or the pre-distortion compensates for the distortion caused by optics block 140). Hence, the scene viewed by the user is not distorted. Accordingly, distortion corrections account for different levels and types of distortion caused by different eye positions relative to optics block 104 or different focal distances of display device 101. Accordingly, the distortion corresponding to different potential eye positions relative to optics block 104 and at potential focal distances for display device 101 is determined by measuring a wavefront (i.e., propagation of points of the same phase) of light from display 102 after the light has passed through optics block 104. Different eye positions relative to optics block 104 and different states of optics block 104 cause different degrees of optical error in light directed through optics block 104. This optical error distorts light from display 102 included in display device 101, which may impair presentation of a virtual scene to a user. Accordingly, distortion correction maps are generated based on measurements of the wavefront for different states of optics block 104 to correct for optical error introduced by the different states of optics block 104, which accounts for different focal distances of display device 101.

Figure 4C:
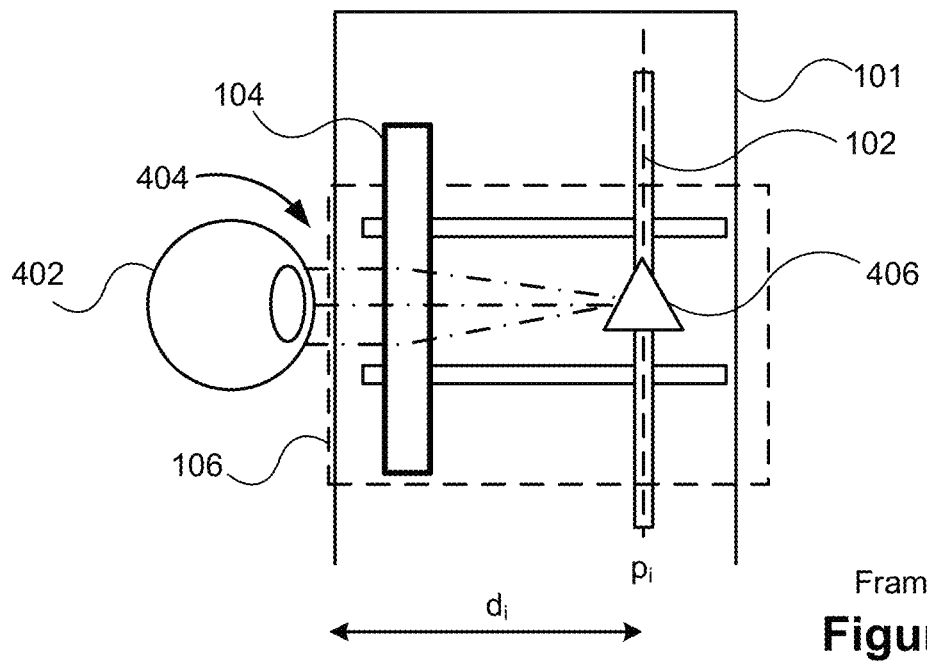
Figure 4D:
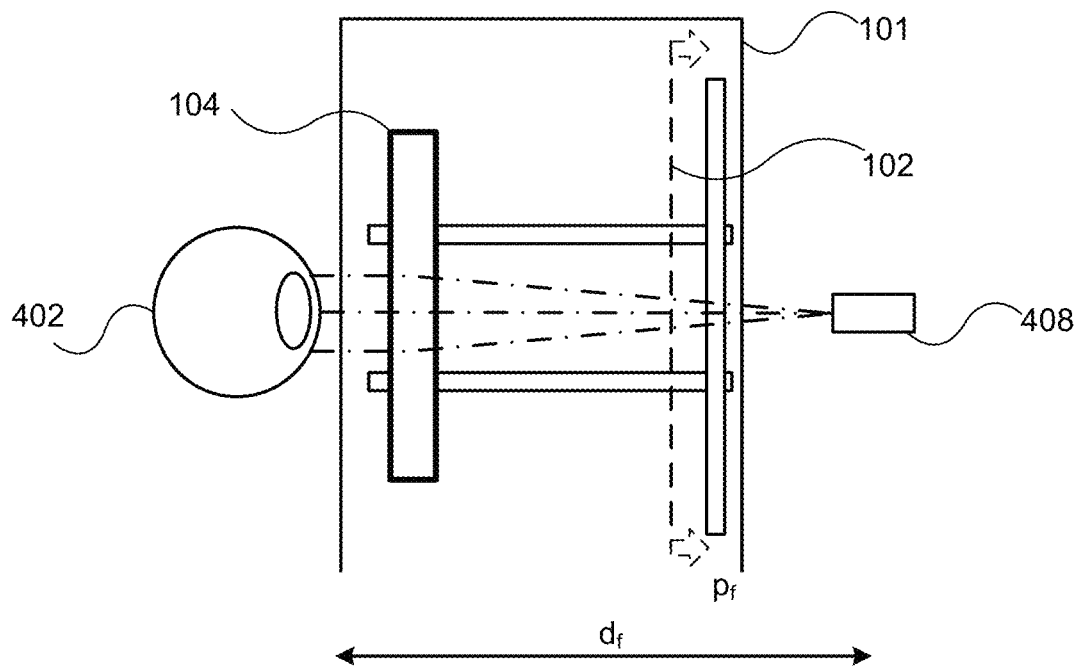

FIGS. 4C-4D show adjusting the focal plane by moving display 102 (e.g., away from user 402) while optics block 104 maintains its position. Alternatively, display device 101 adjusts the focal plane by moving display 102 closer to user 402 while optics block 104 maintains its position. In some embodiments, display device 101 adjusts the focal plane by moving optics block 104 while display 102 maintains its position. Thus, although the focal plane can be adjusted by moving both optics block 104 and display 102 as shown in FIGS. 4A-4B, it is not necessary to move both optics block 104 and display 102 for adjusting the focal plane.

Varifocal Actuation

As described above, varifocal actuation block 106 enables dynamic adjustment of the focal plane of display device 101 to keep a user's eyes in a zone of comfort as vergence and accommodation change. In some embodiments, varifocal actuation block 106 physically changes the distance between display 102 and optics block 104 by moving display 102 or optics block 104 (or both). Moving or translating two lenses that are part of optics block 104 relative to each other may also be used to change a focal distance of optics block 104 of display device 101, which, in turn, changes the focal plane. As discussed in more detail below with reference to FIG. 7, in some embodiments, varifocal actuation block 106 physically changes the distance between display 102 and optics block 104 after display device 101 receives information from application engine 156.

Figure 5A:
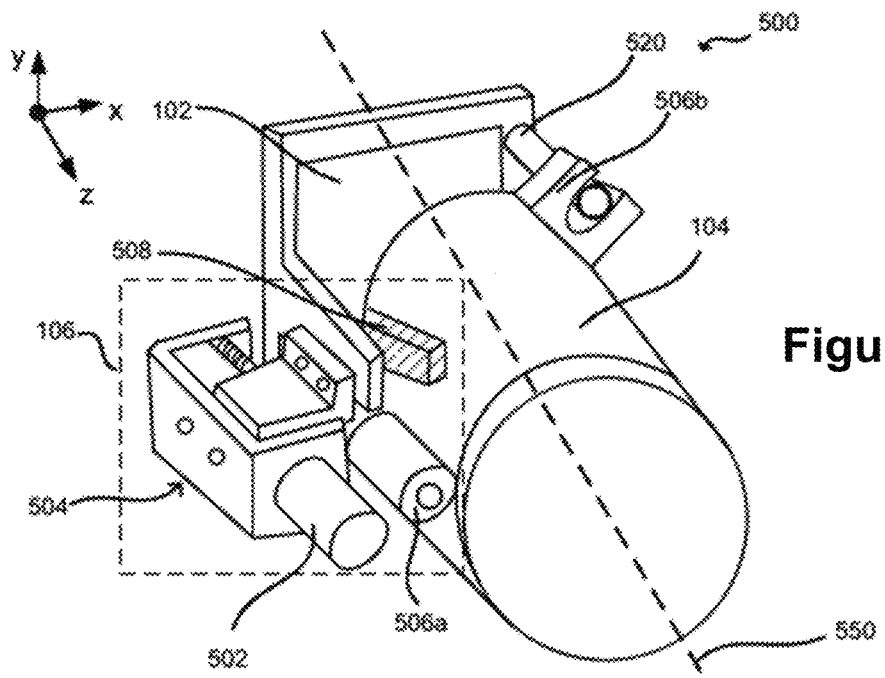
FIGS. 5A-5C show a varifocal actuation block that includes a lead screw in accordance with some embodiments.
Figure 5B:
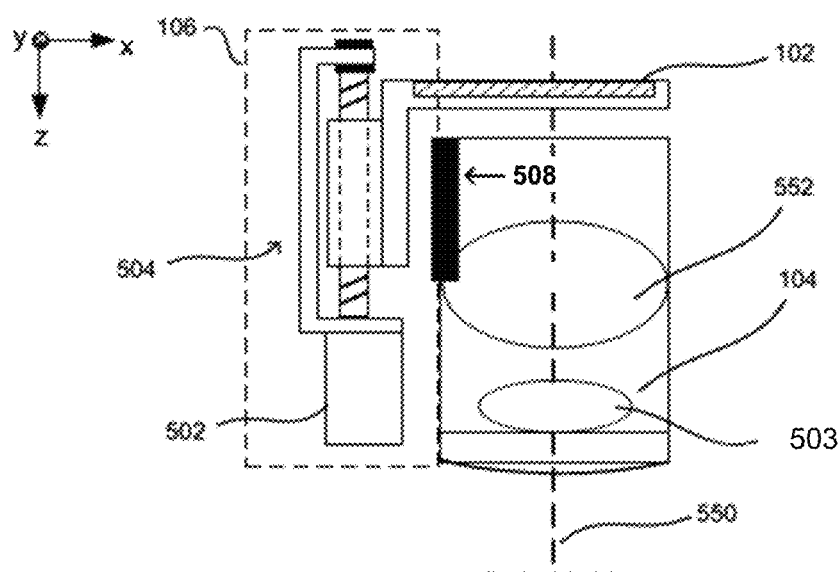
Figure 5C:
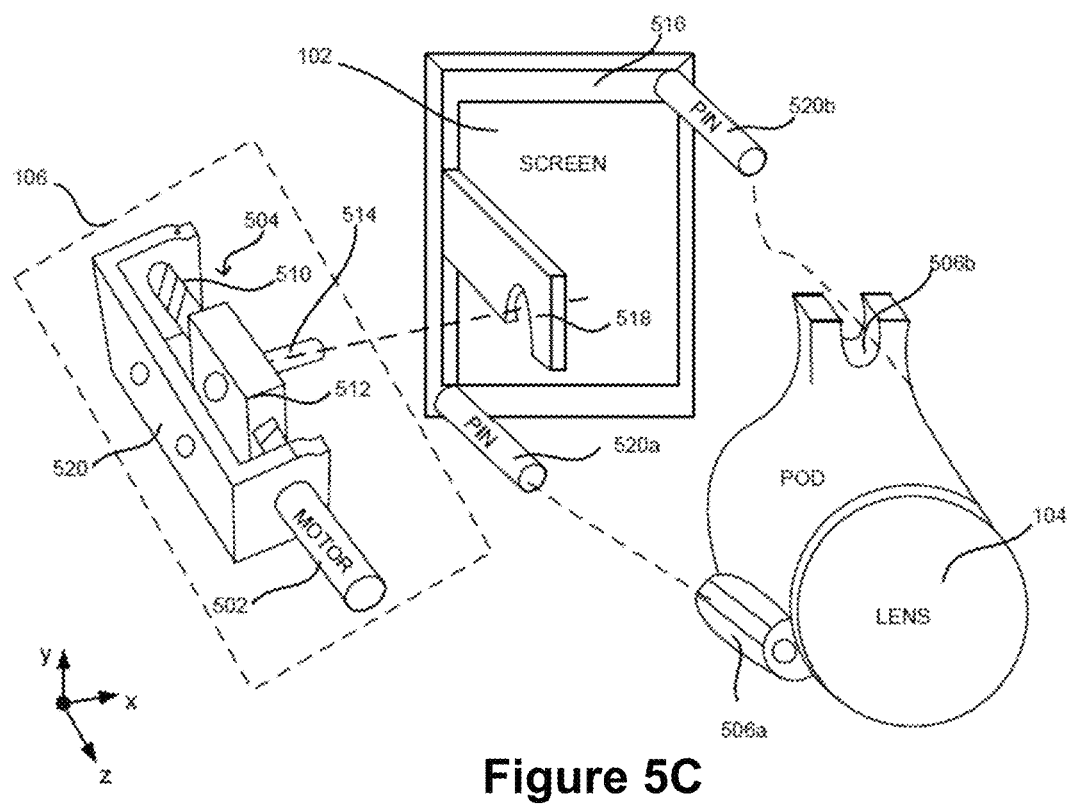

FIGS. 5A-5C show varifocal actuation block 106 that include a lead screw in accordance with some embodiments. Each view in FIGS. 5A-5C shows varifocal actuation block 106 that corresponds to a single eye of a user. In some embodiments, display device 101 includes two such portions (e.g., display device 101 includes two displays 102, optical blocks 104, and varifocal actuation blocks 106). It is noted that in some embodiments, however, display device 101 includes a single display 102 and a single varifocal actuation block 106 (or multiple varifocal actuation blocks 106 positioned at different positions on the single display 102). Additionally, other configurations of components described herein are possible.

FIG. 5A is a perspective view of a portion of display device 101 that includes display 102, optics block 104, and varifocal actuation block 106. Varifocal actuation block 106, in some embodiments, includes motor 502 (e.g., stepper motor) and drive mechanism 504 (e.g., lead screw, ball screw, geared spindle drive, etc.) configured to move display 102 toward and away from optics block 104 along optical axis 550 (or z-axis) along one or more guides 506. In some embodiments, when electronic display 102 moves along the optical axis, the electronic display 102 may also move in a direction that is perpendicular to the optical axis. In some embodiments, when electronic display 102 moves along the optical axis, the electronic display 102 does not move in a direction that is perpendicular to the optical axis.

In some embodiments, drive mechanism 504 is positioned relative to optics block 104 (e.g., mounted directly to optics block 104). In some embodiments, drive mechanism 504 is positioned relative to a housing of display device 101, or a bracket of display device 101, etc. In FIG. 5A, display device 101 also includes position sensor 508 to determine a position of optics block 104 (e.g., an absolute position or a position relative to display 102). In some embodiments, display device 101, additionally or alternatively, includes a position sensor to determine a position of display 102 (e.g., an absolute position or a position relative to optics block 104).

FIG. 5B is a plan view of the portion of display device 101 shown in FIG. 5A. In FIG. 5B, drive mechanism 504 is coupled with display 102. FIG. 5B additionally shows optional camera 503 and optional hot mirror 552, in accordance with some embodiments of display device 101. As described above, the position of display 102, at least in some embodiments, is selected based on (or adjusted in response to) the focal plane corresponding to a vergence depth determined from the vergence angle of the user's eyes. In some embodiments, the vergence angle is determined from real-time eye tracking. The position of an eye may be captured by camera 302, which is located off-axis (e.g., at an angle relative to optical axis 550). In some embodiments, camera 302 is an infrared (IR) camera that receives IR light reflected from the eye of the user via hot mirror 552 located between display 102 and optics block 104. Hot mirror 552 is positioned at an angle relative to display 102 in order to reflect the IR light off-axis toward camera 302. Here, hot mirror 552 is transparent to visible light to allow the visible light from display 102 to pass through to a viewing user unimpeded while reflecting the IR light to camera 302. Thus, camera 302 captures IR light reflected from a retina of the user (and hot mirror 552) and this information for the position of the user's eye is provided to determine the vergence depth.

Accordingly, the focal plane of display device 101 may be adjusted to match the determined vergence depth. Drive mechanism 504, in substantially real-time, moves display 102 relative to optics block 104 to adjust the focal plane of display device 101 to the determined vergence depth utilizing screen positioning feedback via a position sensor 508 (e.g., a linear or proximity encoder). A positional precision of ~100 microns or better is achievable with commercially available linear encoding systems.

FIG. 5C shows an exploded view of a portion of display device 101 described with respect to FIGS. 5A-5B. In FIG. 5C, components of display 102, optics block 104, and varifocal actuation block 106 are shown separately with indications corresponding to how display 102, optics block 104, and varifocal actuation block 106 fit together. In FIG. 5C, drive mechanism 504 of varifocal actuation block 106 includes lead screw 510 (also referred to herein as a rotational component) driven by motor 502 and nut-sled 512. Lead screw 510 and motor 502 (e.g., stepper motor) are supported by bracket 520, which can be fixed to a housing of display device 101 or to optics block 104. Although shown outside of bracket 520, motor 502 could be located parallel to lead screw 510 inside of bracket 520 and engage lead screw 510 through gears (e.g., a first gear for motor 502 and a second gear for lead screw 510). The gears can be located outside, or inside, of bracket 520. Nut-sled 512 includes push pin 514, and is threaded to move along lead screw 510 when lead screw 510 is turned and moves back and forth depending on which direction lead screw 510 is turned. Additionally, in some embodiments, drive mechanism 504 includes a preload spring (e.g., positioned around, in parallel to, lead screw 510) configured to reduce backlash of drive mechanism 504. In some embodiments, drive mechanism 504 may also use different screw types including a nut-sled interaction and screw end support methodologies.

In some embodiments, optics block 104 is fixed within display device 101, and display 102 is moved relative to optics block 104 based on the determined vergence depth. Here, display 102 is mounted to display bracket 516 that optionally includes display bracket arm 518 and guide pins 520a, 520b. Accordingly, display bracket arm 518 receives or engages push pin 514 of drive mechanism 504 and guide pins 520a, 520b slide freely within guides 506. Thus, as nut-sled 512 moves along lead screw 510, push pin 514 engages display bracket arm 518 and moves display bracket 516, which supports display 102, and guide pins 520a and 520b guide the movement of display 102 relative to optics block 104 by engaging guides 506 (e.g., 506a and 506b) of optics block 104.

Figure 6A:
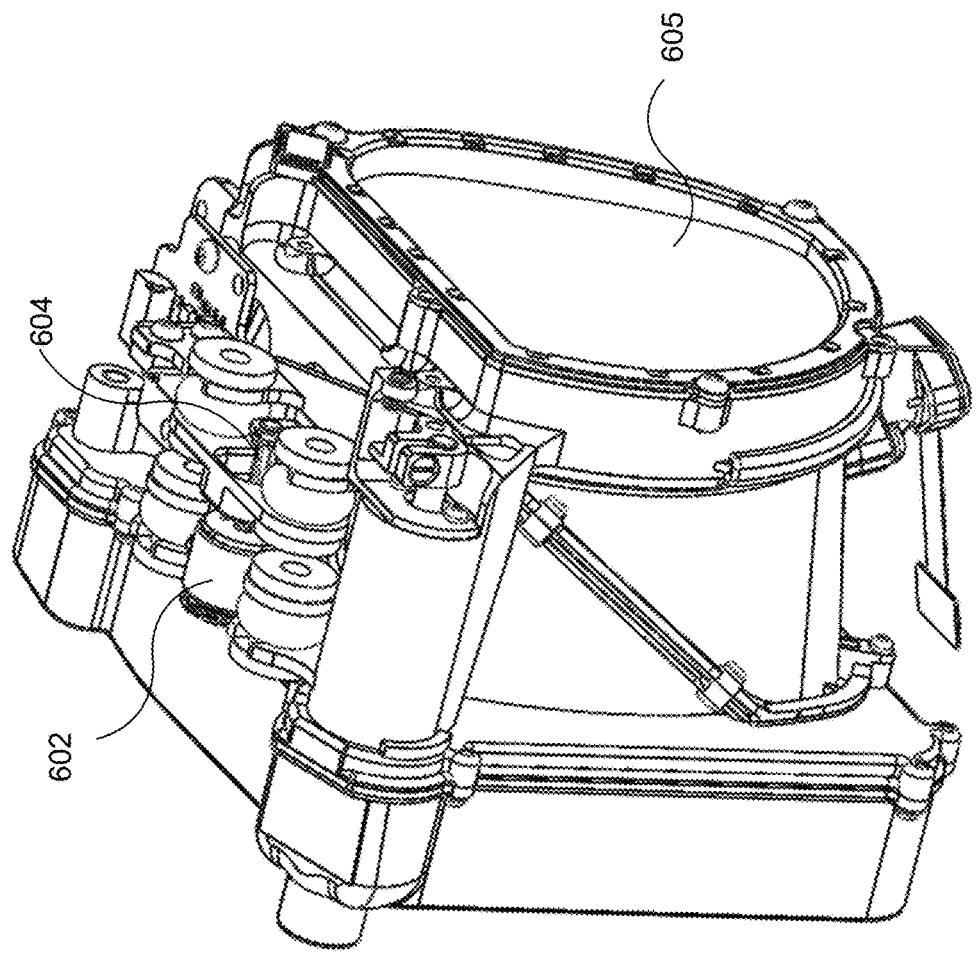
FIGS. 6A and 6B show a varifocal actuation block in accordance with some embodiments.
Figure 6B:
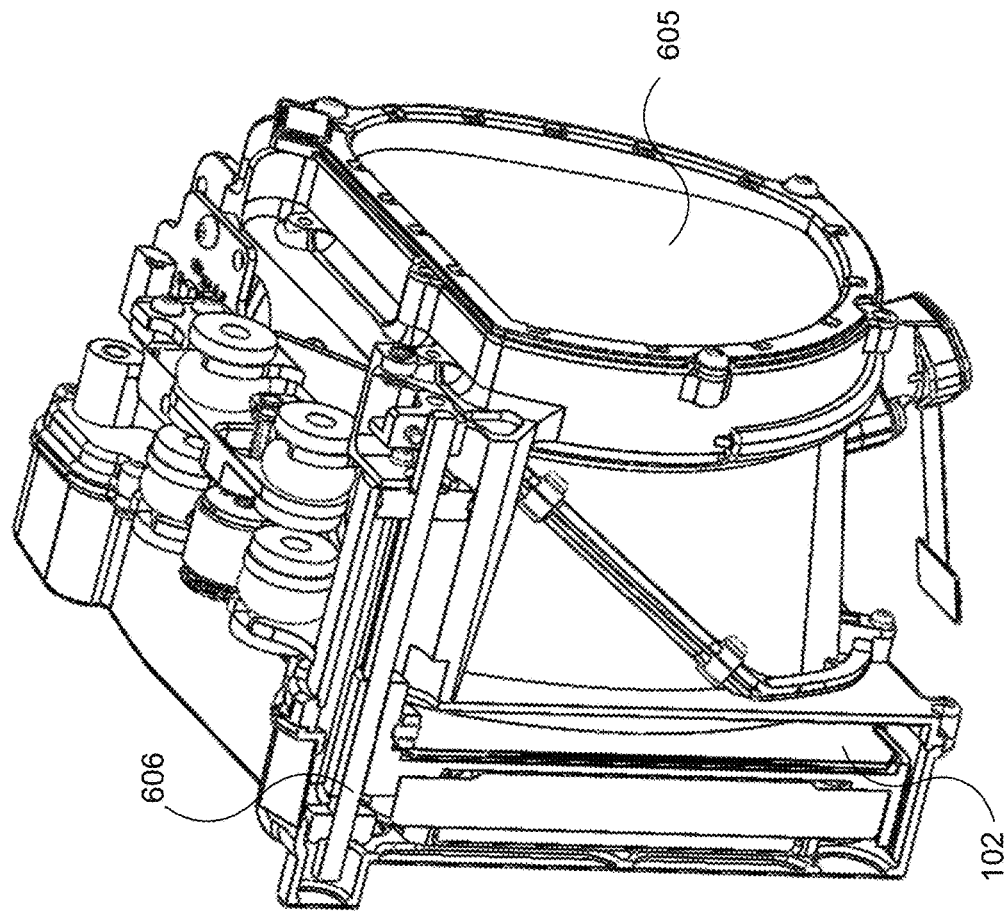

FIGS. 6A-6B show varifocal actuation block 106 in accordance with some embodiments. Each view of FIGS. 6A-6B includes optics block 104 and varifocal actuation block 106 for a single eye of a user. In practice, display device 101 would include two such portions (e.g., display device 101 would include two displays 102, two optical blocks 104, and two varifocal actuation blocks 106). It is noted that in some embodiments, however, display device 101 may include a single display 102 and one or more varifocal actuation blocks 106.

FIG. 6A is a perspective view of varifocal actuation block 106 in accordance with some embodiments. Varifocal actuation block 106, in some embodiments, includes stepper motor 602 and drive mechanism 604 (e.g., lead screw, ball screw, geared spindle drive, etc.). In FIG. 6A, drive mechanism 604 is coupled to an electronic display so that the display can move relative to an optics block. Alternatively or in addition, drive mechanism 604 can be coupled to the optics block so that the optics block can move relative to the display. Stepper motor 602 and drive mechanism 604 are used to move display 102 (shown in FIG. 6B) toward and away from optics block 104 (e.g., lens 605) along an optical axis (e.g., optical axis 550, FIG. 5A) via one or more guides 606.

FIG. 6B is a partial cross-sectional view of varifocal actuation block 106 shown in FIG. 6A. FIG. 6B shows display 102 (e.g., a light-emitting diode display, an organic light-emitting diode display, etc.) coupled to varifocal actuation block 106. As described above, the position of display 102, at least in some embodiments, is driven by (or adjusted in response to) the focal plane corresponding to a vergence depth determined from the vergence angle of the user's eyes, which is obtained from real-time eye tracking. The position of an eye may be captured by camera 302 (as described above with reference to FIGS. 5A-5C). Accordingly, stepper motor 602 may move display 102 toward and away from optics block 104 (e.g., lens 605) along the optical axis based on the real-time eye tracking.

FIG. 6B also illustrates guide 606, which is configured to guide movement of display 102 relative to optics block 104. For example, guide 606 constricts the movement of display 102 to a particular axis (e.g., guide 606 constricts the movement of display 102 to an optical axis of optics block 104 so that display 102 can move toward or away from optics block 104, but cannot move in a direction perpendicular to the optical axis of optics block 104). Although not shown, display device 101 may include multiple guides 606. Typically, multiple guides 606 are positioned parallel to one another.

Figure 7:
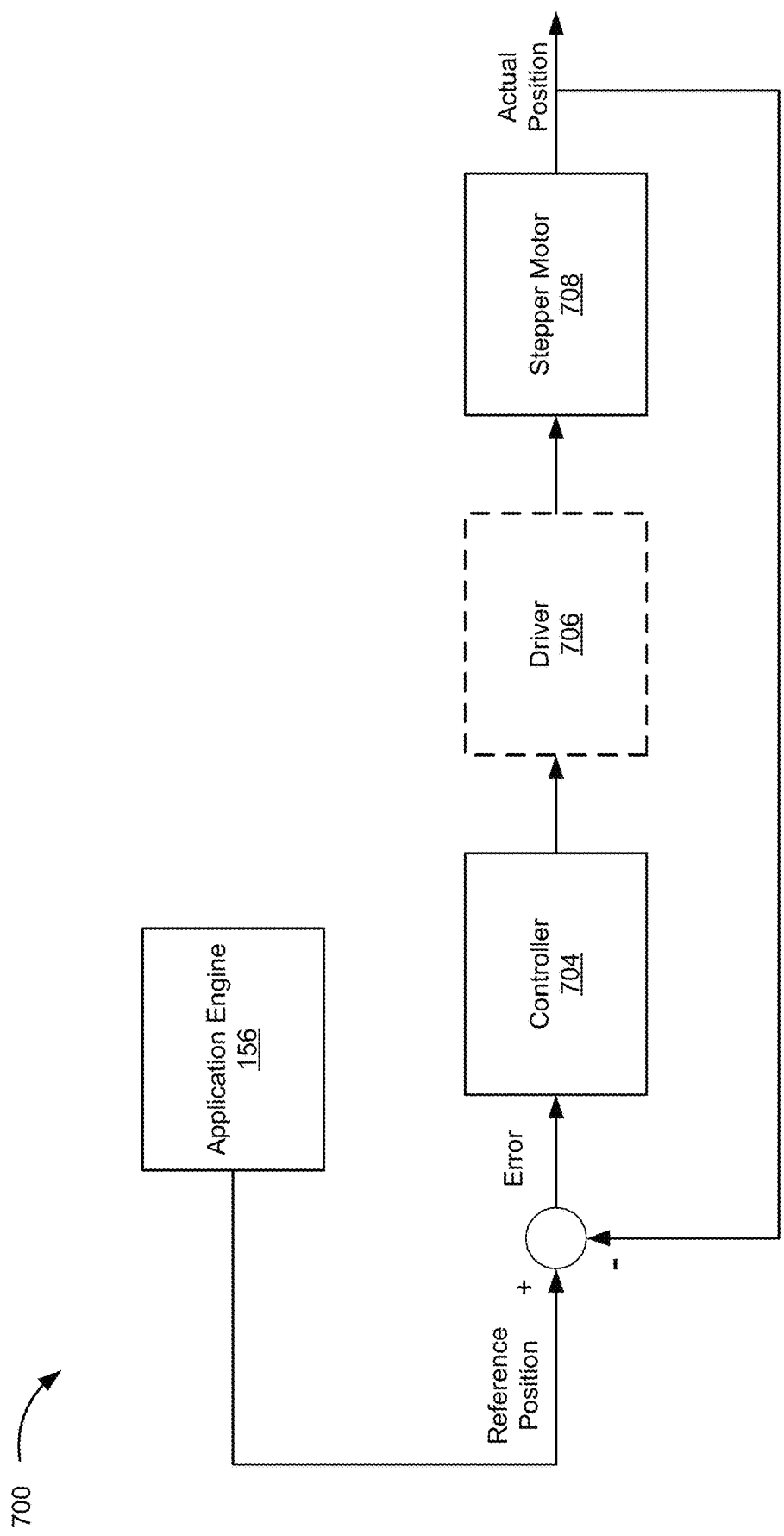
FIG. 7 shows a block diagram illustrating a control system for a stepper motor in accordance with some embodiments.

FIG. 7 shows block diagram 700 illustrating a control system for a stepper motor in accordance with some embodiments. Block diagram 700 includes application engine 156 (e.g., application engine 156 of console 150, FIG. 1), controller 704 (e.g., one or more processors 103, FIG. 1 or a dedicated stepper motor controller circuit), driver 706 (e.g., part of or associated with varifocal actuation block 106), and stepper motor 708 (e.g., stepper motor 602, FIG. 6A). Stepper motor 708 may be various types of stepper motors. In some embodiments, stepper motor 708 is a unipolar stepper motor or a bipolar stepper motor. In some embodiments, stepper motor 708 is a bipolar stepper motor with series windings, a bipolar stepper motor with parallel windings, a bipolar stepper motor with a single winding per phase. Examples of stepper motor 708 include but are not limited to: a 6-lead unipolar stepper motor, a 4-lead bipolar stepper motor, a 6-lead bipolar serial connection stepper motor, a 6-lead bipolar parallel connection stepper motor, an 8-lead bipolar serial connection stepper motor, and an 8-lead bipolar parallel connection stepper motor. In some embodiments, controller 704 is a proportional-integral-derivative (PID) controller, or the like.

Controller 704 is configured to move (or cause movement of) display 102 from a current (actual) positon (e.g., position $p_i$, FIG. 4A) to a new (reference) position (e.g., position $p_f$, FIG. 4B). In some embodiments, controller 704 determines the actual position of display 102 based on a current rotational position of a rotatable component (e.g., drive mechanism 604, FIG. 6A) of stepper motor 708. For example, controller 704 may determine that the rotatable component has rotated x-number of times from a baseline rotational position. Based on the amount of rotation, controller 704 can determine the actual position of display 102. In another example (separate from or in combination with the previous example), display device 101 tracks (e.g., in memory 122, FIG. 1) a current rotational position of the rotatable component, and determines (or estimates) the actual position of display 102 based on the current rotational position. In some embodiments, controller 704 includes memory for storing information indicating the baseline rotational position of the rotatable component and/or information indicating the current rotational position of the rotatable component. In some embodiments, controller 704 is also configured to move (or cause movement of) optics block 104 from a current positon to a new position (in addition to or separate from causing moving of display 102).

In some embodiments, controller 704 receives information indicating a representative position of display 102 and/or optical block 104 from one or more position sensors (e.g., encoder 508, FIG. 5A), and determines the actual position of display 102 (and/or optics block 104) based on information from the one or more position sensors (e.g., encoder 508, FIG. 5A). As explained above with reference to FIGS. 5A-5B, display device 101 includes encoder 508 configured to determine a position of display 102 (e.g., provide positioning feedback). In some embodiments, one or more position sensors continuously send the position of display 102 to controller 704. Alternatively, one or more position sensors may send the position of display 102 to controller 704 at predefined intervals or in response to a request from controller 704.

In some embodiments, controller 704 receives the new (reference) position of display 102 (e.g., position $p_f$) from application engine 156. Controller 704 is configured to determine a difference, if any, between the actual position of display 102 and the reference position in response to receiving the reference position of display 102. Controller 704 is configured to generate one or more electrical signals that cause stepper motor 708 to move display 102 (and/or optics block 104) from the current position toward the reference position (e.g., if there is a difference between the actual position of display 102 and the reference position). In some embodiments, the one or more electrical signals include information indicating the determined difference between the actual position of display 102 and the reference position, along with other information. In some embodiments, the one or more electrical signals include information that is based on the determined difference between the actual position of display 102 and the reference position, but does not directly indicate the determined difference between the actual position of display 102 and the reference position. For example, the one or more electrical signals may indicate a degree of rotation (e.g., a number of rotations or a fraction thereof for the rotatable component of stepper motor 708). Moreover, the one or more electrical signals may indicate a speed of rotation, an acceleration of rotation, and a direction of rotation.

In some embodiments, driver 706 receives and processes the one or more electrical signals generated by controller 704, and driver 706 controls actuation of stepper motor 708 based on the one or more electrical signals. For example, driver 706 may generate a pattern of electrical driver signals according to the one or more electrical signals generated by controller 704. In some embodiments, the one or more electrical signals generated by controller 704 indicate the speed of rotation, the acceleration of rotation, the direction of rotation, and/or the degree of rotation, and the pattern of electrical driver signals corresponds to the speed of rotation, the acceleration of rotation, the direction of rotation, and/or the degree of rotation indicated by the one or more electrical signals. Moreover, the pattern of electrical driver signals, when received by stepper motor 708, causes rotation of the rotatable component of stepper motor 708 pursuant to the speed of rotation, the acceleration of rotation, the direction of rotation, and/or the degree of rotation. In doing so, display 102 (and/or optics block 104) is moved from its current position to the new position (i.e., the reference position).

In some embodiments, the one or more electrical signals generated by controller 704 are provided to driver 706 in a first number of channels (e.g., a single-bit channel, an 8-bit channel, etc.) and driver 706 outputs the pattern of electrical driver signals in a second number of channels (e.g., 2, 4, 6, or 8 channels) that is distinct from the first number of channels.

In some embodiments, the pattern of electrical signals is a predefined pattern of electrical signals. In some embodiments, the pattern of electrical driver signals is included in a lookup table (e.g., lookup table 900 or lookup table 910), and driver 706 references the lookup table when receiving and processing the one or more electrical signals generated by controller 704. In some embodiments, the lookup table can be stored in memory 122 (FIG. 1).

In some instances, a magnitude of current associated with the electrical driver signals delivered to stepper motor 708 exceeds (or would exceed) a threshold. Current with a magnitude (e.g., amperage) exceeding the threshold may cause stepper motor 708 to stall.

Accordingly, in such instances, driver 706 reduces the magnitude of the current in response to determining that a measured magnitude of the current satisfies (e.g., exceeds) the threshold. To reduce the magnitude, driver 706 can decrease an amplitude, skip a cycle, and/or adjust a duty cycle of the pattern of electrical driver signals. Reducing a magnitude of the current delivered to stepper motor 708 is discussed in further detail below with reference to FIG. 10.

Application engine 156 provides the reference position to controller 704. In some embodiments, application engine 156 provides the reference position in response to receiving information from one or more components of display device 101 indicating that display device 101 requires a focal plane adjustment (e.g., a user of display device 101 refocused his or her eyes). The one or more components may include focus prediction module 108, eye tracking module 110, vergence processing module 112, locators 114, IMU 116, and/or head tracking sensors 118. For example, application engine 156 may receive eye tracking and three-dimensional gaze point information from display device 101, and based on this information, application engine 156 determines the reference position. In another example (in addition to or separate from the previous example), application engine 156 may receive position, orientation, and/or movement information from display device 101, and based on this information, application engine 156 determines the reference position. Focal plane adjustments are discussed in detail above with reference to FIGS. 1-3.

Figure 8A:
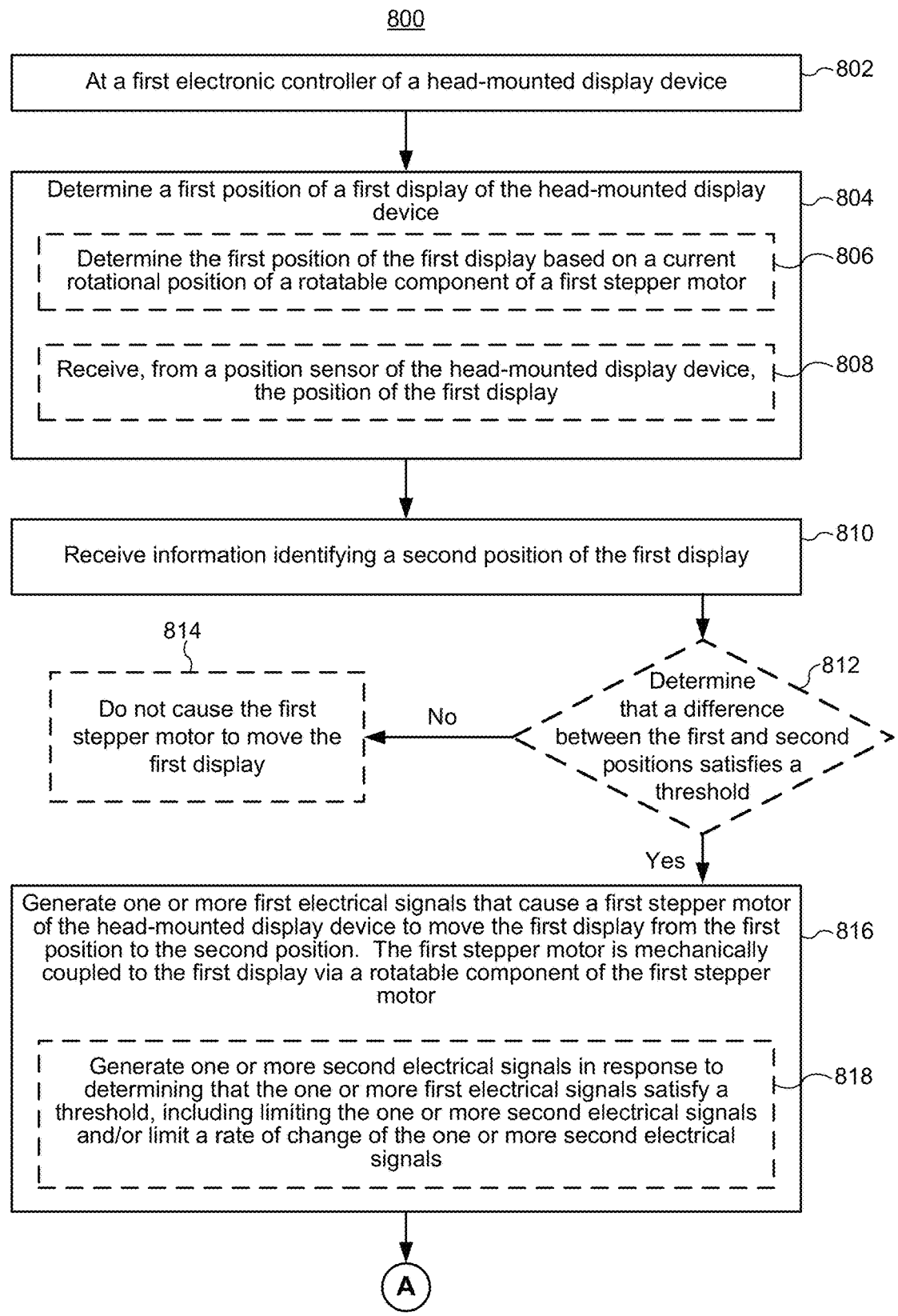
FIGS. 8A-8B are flow diagrams showing a method of adjusting positions of an electronic display in accordance with some embodiments.
Figure 8B:
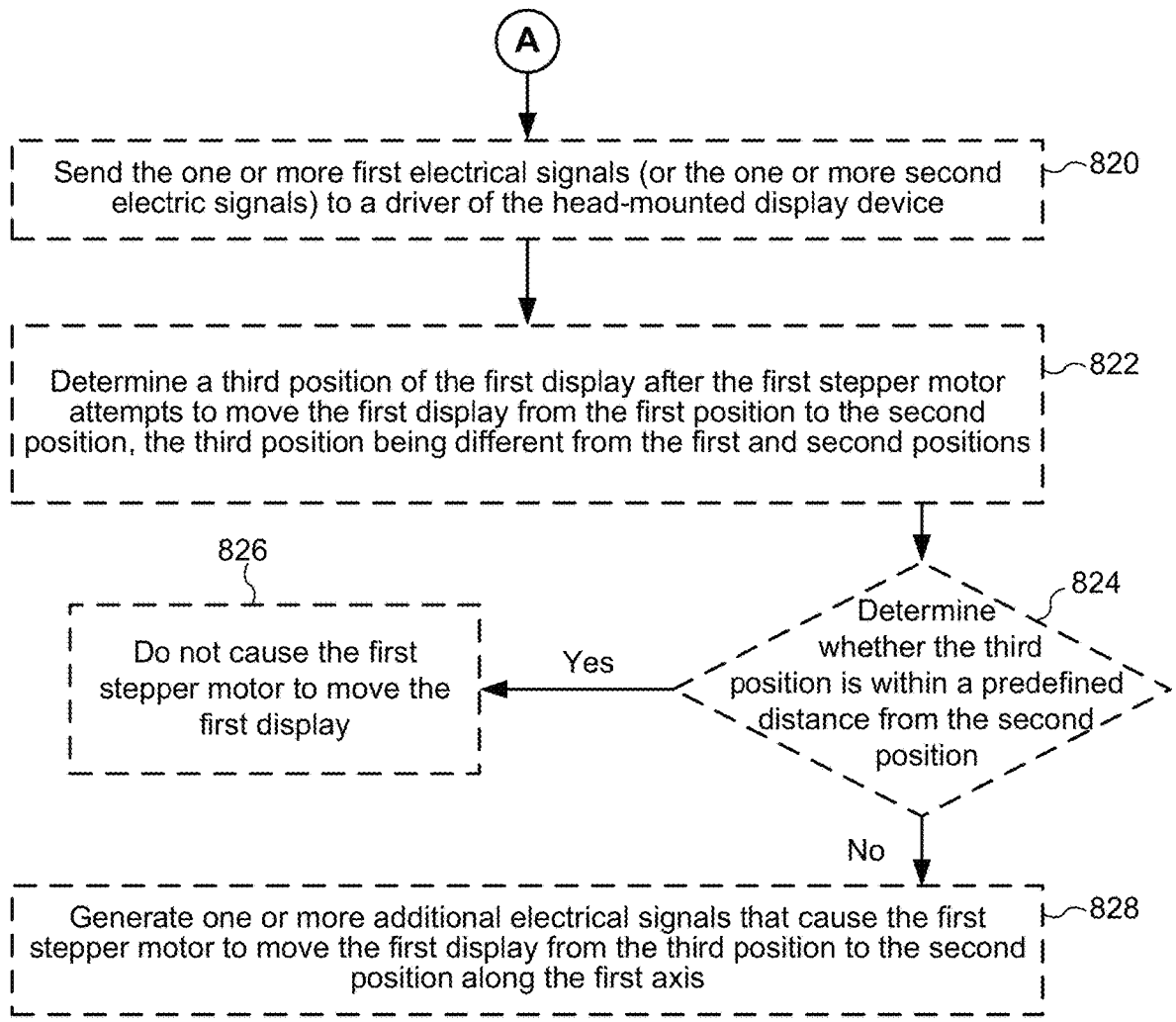

FIGS. 8A-8B are flow diagrams illustrating method 800 of adjusting positions of display 102 in accordance with some embodiments. Operations (e.g., steps) of method 800 may be performed by a head-mounted display device (e.g., display device 101) or by one or more components thereof (e.g., one or more components of display device 101 shown in FIG. 1). At least some of the operations shown in FIGS. 8A-8B correspond to instructions stored in a computer memory or computer-readable storage medium (e.g., memory 122 of display device, FIG. 1).

In some embodiments, one or more operations of method 800 are performed by an electronic controller (e.g., controller 704, FIG. 7) of the head-mounted display device (802). In some embodiments, controller 704 is part of or an example of one or more processors 103. In some embodiments, controller 704 is distinct and separate from one or more processors 103. The head-mounted display device may further include a first stepper motor (e.g., stepper motor 602, FIG. 6A), a first display (e.g., display 102, FIG. 1), and a first set of one or more lenses (e.g., lens 605, FIG. 6A). In some embodiments, the first stepper motor is mechanically coupled to the first display (e.g., directly or indirectly, rigidly or slidingly via a rotatable component of the first stepper motor). For example, the first stepper motor is rigidly coupled to the first display or one or more mechanical components holding the first display (e.g., a frame) and slidingly coupled to the optics block or a housing thereof via a combination of a lead screw and a nut (or other appropriate fastener) rigidly coupled to the optics block or the housing thereof. In another example, the first stepper motor is rigidly coupled to the optics block or the housing thereof and slidingly coupled to the first display or one or more mechanical components holding the first display via a combination of a lead screw and a nut (or other appropriate fastener) rigidly coupled to the first display or one or more mechanical components holding the first display. The first set of one or more lenses is configured to focus light from the first display along a first axis (e.g., optical axis 550, FIG. 5A). In some embodiments, the first stepper motor is mechanically coupled to the first set of one or more lenses.

Method 800 includes determining (804) a first position of the first display and/or the first set of one or more lenses. In some instances, the first display and/or the first set of one or more lenses is positioned at the first position to bring one or more images presented to a user wearing the head-mounted display device 101 into focus, which keeps the user's eyes in a zone of comfort as vergence and accommodation change. To provide context, operation 804 can correspond to the situations shown in FIGS. 4A and 4C.

In some embodiments, determining (804) the first position of the first display and/or the first set of one or more lenses is based on a current rotational position of a rotatable component (e.g., rotational component 604, FIG. 6A) of the first stepper motor (806). For example, the electronic controller may determine that the rotatable component has rotated x-number of times (or a certain angle) from a baseline rotational position. In some embodiments, the baseline rotational position is a factory calibrated/set baseline (e.g., a home position), whereas in some other embodiments, the baseline rotational position is a current rotational position of the rotatable component (e.g., baseline is updated after each adjustment of display 102). Thus, based on the number of rotations, the electronic controller is able to determine the first position of display. In some embodiments, the current rotational position of the rotatable component can be stored in memory 122 (FIG. 1) of the head-mounted display device.

In some embodiments (separate from or in addition to other embodiments described herein), the head-mounted display device includes a position sensor (e.g., encoder 508, FIG. 5A) in communication with the first electronic controller. The position sensor is configured to determine a position of the first display and/or the first set of one or more lenses. Accordingly, in some embodiments, method 800 further includes receiving (808), from the position sensor, the position of the first display and/or the first set of one or more lenses, and determining (804) the first position of the first display and/or the first set of one or more lenses based on the position of the first display and/or the first set of one or more lenses received from the position sensor.

In some embodiments, the device determines the first position of the first display and/or the first set of one or more lenses solely based on the rotational position of the first stepper motor. This allows an open-loop control of the position of the first display and/or the first set of one or more lenses. Thus, in such embodiments, the device does not (or need not) include one or more position sensors to determine the first position of the first display and/or the first set of one or more lenses.

In some embodiments, the first position of the first display and/or the first set of one or more lenses corresponds to a certain distance from a predetermined position. For example, the electronic controller may determine that the first position of the first display and/or the first set of one or more lenses is x-units away from the predetermined position using operation 806, operation 808, or some combination thereof. The predetermined position may be a home position, which is where the first display and/or the first set of one or more lenses is moved to when the head-mounted display device is in a particular state (e.g., powered off, idle, etc.). Alternatively, the predetermined position may be a baseline (e.g., the factory calibrated baseline or the baseline that is updated after each adjustment).

Method 800 further includes receiving (810) information identifying a second position (e.g., position $p_f$, FIG. 4B) of the first display and/or the first set of one or more lenses. In some embodiments, the first position of the first display and/or the first set of one or more lenses is selected for first visual data to be displayed by the first display and/or the first set of one or more lenses and the second position is selected for second visual data to be displayed by the first display. For example, the first visual data corresponding to the first position may depict a first scene (e.g., a distant peak in a mountain range), whereas the second visual data corresponding to the second position may depict a second scene different from the first scene (e.g., user moves head, and in turn the head-mounted display device, to focus on an object in his or her hands).

In some embodiments, the information identifying the second position is received from a host (e.g., console 150, or more specifically, application engine 156 of console 150, FIG. 1) of the head-mounted display device. In some embodiments, the host determines the second position using information generated by the head-mounted display device. For example, information from focus prediction module 108, eye tracking module 110, vergence processing module 112, locators 114, IMU 116, and/or head tracking sensors 118 can be used by the host to create the information identifying the second position. Determining the second position (e.g., the reference position) is discussed in further detail above with reference to FIG. 7.

In some embodiments, method 800 further includes determining (812) whether a difference between the first and second positions satisfies a threshold. For example, if a difference between the first and second positions is too trivial or minor to warrant moving the first display, then the electronic controller may forgo taking the actions necessary to move the first display. Accordingly, in response to determining that the difference between the first and second positions does not satisfy the threshold (812-No), method 800 further includes not causing (814) the first stepper motor to move the first display and/or the first set of one or more lenses (e.g., maintaining the first display and the first set of one or more lenses at their current positions).

However, in response to determining that the difference between the first and second positions satisfies the threshold (812-Yes) (e.g., "Error" in FIG. 7 is greater than the threshold), method 800 further includes generating (816) one or more first electrical signals (and in some cases, one or more second electrical signals) that cause the first stepper motor to move the first display and/or the first set of one or more lenses from the first position to the second position. In doing so, the display device changes the focal plane in presenting images to the user wearing the head-mounted display device.

In some embodiments, method 800 further includes generating (818) the one or more second electrical signals (e.g., based on the one or more first electrical signals) in response to determining that the one or more first electrical signals satisfy a stall threshold, including limiting the one or more second electrical signals and/or limiting a rate of change of the one or more second electrical signals. In some cases, the stall threshold corresponds to values of torque and/or rotational speed of the stepper motor that, when exceeded, cause the stepper motor to stall. Accordingly, in accordance with a determination that the one or more first electrical signals would cause the stepper motor to stall, the electronic controller generates the one or more second electrical signals (with reduced signal amplitudes and/or a reduced rate of change for the signal amplitudes) to prevent said stalling.

It is noted that clockwise rotation of the rotatable component moves the first display and/or the first set of one or more lenses in a first direction along the first axis and counterclockwise rotation of the rotatable component moves the first display and/or the first set of one or more lenses in a second direction opposite to the first direction along the first axis.

In some embodiments, the head-mounted display device includes a driver (e.g., driver 706, FIG. 7). The driver may be in communication with the first electronic controller and the first stepper motor (e.g., driver 706 is positioned between and electrically coupled to controller 704 and stepper motor 708, FIG. 7). In some embodiments, method 800 further comprises sending (820) the one or more first electrical signals (or the one or more second electrical signals when the one or more second electrical signals are available) to the driver. The driver is configured to receive the one or more electrical signals from the electronic controller, and generate and provide a predefined pattern of driver signals to the first stepper motor according to the one or more electrical signals. The predefined pattern of driver signals causes the first stepper motor to rotate the rotatable component.

For example, with reference to FIGS. 4A-4B, the predefined pattern of driver signals causes the first stepper motor to move display 102 from position $p_i$ to position $p_f$. Moreover, a speed and acceleration at which the first stepper motor moves display 102 from position $p_i$ to position pf may be defined by the predefined pattern of driver signals. Additionally, a direction of rotation may also be defined by the predefined pattern of driver signals (e.g., clockwise versus counterclockwise rotation of the rotatable shaft).

In some embodiments, the first set of one or more lenses remains stationary (e.g., relative to the frame of the display device) during and after the moving of the first display. Alternatively, in some embodiments, the first set of one or more lenses is also moved (e.g., as shown in FIGS. 4A-4B). In some embodiments, the first display remains stationary during and after moving the first set of one or more lenses.

In some embodiments, the driver controls generation of the predefined pattern of driver signals using a lookup table (e.g., lookup tables 900 and 910, FIGS. 9A and 9B). In some embodiments, the lookup table includes a first lookup table for a first configuration of the first stepper motor. For example, when the first stepper motor is operated in a 6-lead unipolar control configuration, lookup table 900 shown in FIG. 9A may be used. In some embodiments, the lookup table includes a second lookup table, different from the first lookup table, for a second configuration, different from the first configuration, of the first stepper motor. For example, when the first stepper motor is operated in a microstep control configuration, lookup table 910 shown in FIG. 9B may be used. These two lookup tables 900 and 910 are mere examples, and various other lookup tables can be used, as known by those skilled in the art.

In some embodiments, method 800 further includes determining (822) a third position of the first display and/or the first set of one or more lenses after the first stepper motor attempts to move the first display and/or the first set of one or more lenses from the first position to the second position.

The third position may be the same as or different from the second position. Next, method 800 may further include determining (824) whether the third position is within a predefined distance from the second position. In some embodiments, the predefined distance is less than approximately 2 mm. In some embodiments, the predefined distance is less than approximately 1 mm. In some embodiments, the predefined distance is less than approximately 0.9 mm. In some embodiments, the predefined distance is less than approximately 0.8 mm. In some embodiments, the predefined distance is less than approximately 0.7 mm. In some embodiments, the predefined distance is less than approximately 0.6 mm. In some embodiments, the predefined distance is less than approximately 0.5 mm. The third position may be determined based on a current rotational position of the rotatable component and/or information gathered by the one or more position sensors (described in further detail with reference to operations 806 and 808).

In response to determining that the third position is within the predefined distance from the second position (824-Yes), method 800 does not cause the first stepper motor to move the first display and/or the first set of one or more lenses again (826). For example, the electronic controller successfully has moved the first display from the first position to the second position. However, in response to determining that the third position is not within the predefined distance from the second position (824-No), method 800 further includes generating (828) one or more additional electrical signals that cause the first stepper motor to move the first display and/or the first set of one or more lenses from the third position to the second position along the first axis.

The purpose of operations 822 through 828 is to determine whether the stepper motor has successfully moved the first display and/or the first set of one or more lenses to the second position. In some instances, the first stepper motor may improperly move the first display and/or the first set of one or more lenses for one reason or another (e.g., the first stepper motor stalls, or some other fault or glitch occurs). Based on the operations 822 through 828, the head-mounted display device operates a feedback loop, thereby allowing the head-mounted display device to reduce for position errors (e.g., errors caused by the first stepper motor).

In some embodiments, operations 822 through 828 are repeated until the display device determines that the first display is within the predefined distance from the second position.

In some embodiments, the head-mounted display device includes a second electronic controller, a second stepper motor (e.g., an instance of stepper motor 602, FIG. 6A), a second display (e.g., an instance of display 102, FIG. 1), and a second set of one or more lenses (e.g., an instance of lens 605, FIG. 6A). The second stepper motor is mechanically coupled to the second display and/or the second set of one or more lenses (e.g., directly or indirectly, rigidly or rotatably via a rotatable component of the second stepper motor). Accordingly, the second electronic controller can also perform the operations of method 800 independently from the first electronic controller (e.g., the first and second displays can move independently from each other). In some embodiments, the second electronic controller performs the operations of method 800 in conjunction with the first electronic controller. In this way, the head-mounted display device includes two displays that can be moved together. In some embodiments, a single electronic controller controls movement of both first and second displays.

FIGS. 9A-9B illustrate example lookup tables that are used for controlling operations of a stepper motor in accordance with some embodiments. As discussed above, the driver may control generation of the predefined pattern of driver signals using a lookup table. For example, when stepper motor 708 is operated by a control configuration of a first type (e.g., 6-lead unipolar stepper motor control configuration), then a predefined pattern of driver signals may be generated by driver 706 (FIG. 7) based on lookup table 900. In another example, when stepper motor 708 is operated by a control configuration of a second type (e.g., microstep control configuration), then the predefined pattern of driver signals may be generated by driver 706 based on lookup table 910. In some embodiments, driver 706 is able to increase or decrease a rotational speed (e.g., rotations per minute) of stepper motor's 708 rotatable component by varying a time interval between each step. Various other lookup tables can be used, depending on the stepper motor type, and the two examples provided are not meant to be limiting.

Figure 10:
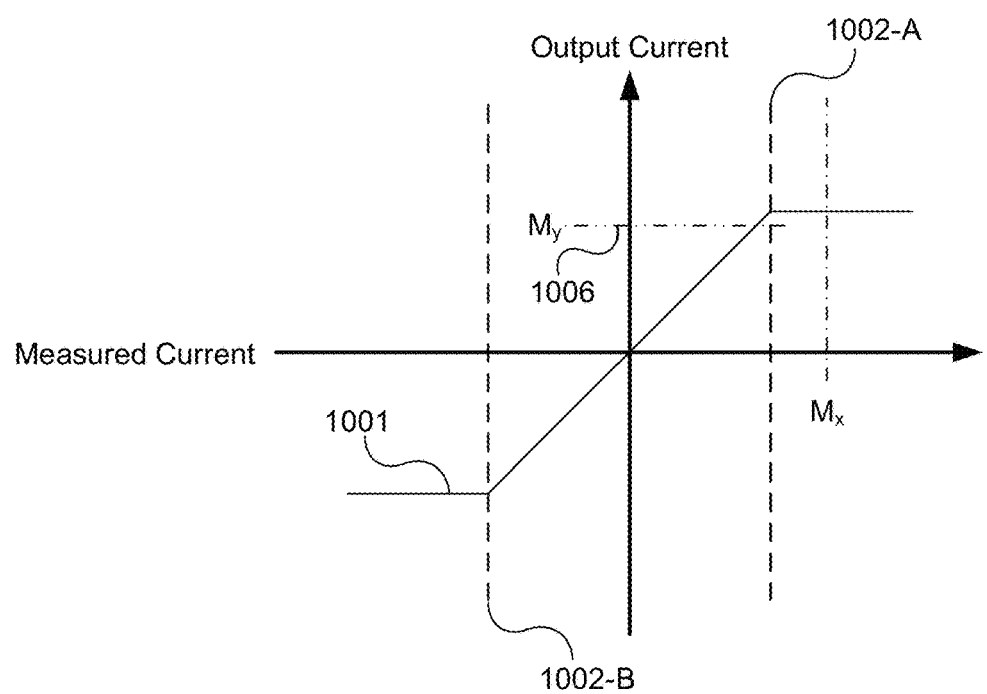
FIG. 10 shows a graph illustrating an operation of an example filter in accordance with some embodiments.

FIG. 10 shows a graph illustrating an operation of an example filter in accordance with some embodiments. The example filter may be used to limit (i.e., reduce) an amount of current delivered to stepper motor 708. Limiting the amount of current, at least in some instances, prevents stepper motor 708 from stalling. Chart 1000 includes measured current on its x-axis and output current on its y-axis. Chart 1000 includes current distribution 1001 and current thresholds 1002-A and 1002-B. As shown in FIG. 10, when measured current $M_x$ satisfies (e.g., exceeds) current threshold 1002-A, display device 101 (or a component thereof such as driver 706, FIG. 7) reduces a magnitude of current (to current threshold 1002-A or a fraction thereof) in response to determining that the measured current satisfies current threshold 1002-A. For example, display device 101 reduces the magnitude of the measured current to magnitude $M_y$ 1006, which corresponds to a fraction of the current threshold (e.g., 90% or 80% of the current threshold). The current of the reduced magnitude is output from the filter. This prevents or reduces stalling of stepper motor 708 caused by an excessive current.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display device, comprising:
   a first display configured to provide light;
   a first stepper motor mechanically coupled to the first display and configured to move the first display;
   a first electronic controller configured to:
      determine a first position of the first display;
      receive information identifying a second position of the first display away from a plane defined by the first display at the first position; and
      generate one or more electrical signals for moving the first display from the first position of the first display to the second position of the first display;
   a second display distinct and separate from the first display;
   a second stepper motor distinct and separate from the first stepper motor, mechanically coupled to the second display, and configured to move the second display; and
   a second electronic controller configured to:
      determine a first position of the second display;
      receive information identifying a second position of the second display away from a plane defined by the second display at the first position of the second display; and
      generate one or more electrical signals for moving the second display from the first position of the second display to the second position of the second display.

2. The head-mounted display device of claim 1, further comprising:
   a driver in communication with the first electronic controller and the first stepper motor and configured to receive the one or more electrical signals and provide a predefined pattern of driver signals to the first stepper motor according to the one or more electrical signals for causing the first stepper motor to move the first display from the first position of the first display to the second position of the first display.

3. The head-mounted display device of claim 1, wherein:
   the first electronic controller is configured to generate one or more second electrical signals in response to determining that the one or more electrical signals satisfy a threshold, including limiting the one or more second electrical signals and/or limiting a rate of change of the one or more second electrical signals.

4. The head-mounted display device of claim 1, wherein the first electronic controller is configured to generate the one or more electrical signals in response to determining that a difference between the first position of the first display and the second position of the first display satisfies a threshold.

5. The head-mounted display device of claim 1, wherein the first electronic controller is further configured to:
   determine a third position of the first display after the first stepper motor attempts to move the first display from the first position of the first display to the second position of the first display, the third position of the first display being different from the first and second positions of the first display;
   determine whether the third position of the first display is within a predefined distance from the second position of the first display; and
   in accordance with determining that the third position of the first display is not within the predefined distance from the second position of the first display, generate one or more additional electrical signals for moving the first display from the third position of the first display to the second position of the first display.

6. A method, comprising:
   at a first electronic controller of a head-mounted display device:
      determining a first position of a first display;
      receiving information identifying a second position of the first display away from a plane defined by the first display at the first position; and
      generating one or more electrical signals for moving the first display from the first position of the first display to the second position of the first display; and
   at a second electronic controller of the head-mounted display device:
      determining a first position of a second display distinct and separate from the first display;
      receiving information identifying a second position of the second display away from a plane defined by the second display at the first position of the second display; and
      generating one or more electrical signals for moving the second display from the first position of the second display to the second position of the second display.

7. The method of claim 6, further comprising:
   receiving the one or more electrical signals and providing a predefined pattern of driver signals to a first stepper motor according to the one or more electrical signals for causing the first stepper motor to move the first display from the first position of the first display to the second position of the first display.

8. The method of claim 6, further comprising:
   generating one or more second electrical signals in response to determining that the one or more electrical signals satisfy a threshold, including limiting the one or more second electrical signals and/or limiting a rate of change of the one or more second electrical signals.

9. The method of claim 6, further comprising:
   generating the one or more electrical signals in response to determining that a difference between the first position of the first display and the second position of the first display satisfies a threshold.

10. The method of claim 6, further comprising:
    determining a third position of the first display after the first stepper motor attempts to move the first display from the first position of the first display to the second position of the first display, the third position of the first display being different from the first and second positions of the first display;
    determining whether the third position of the first display is within a predefined distance from the second position of the first display; and
    in accordance with determining that the third position of the first display is not within the predefined distance from the second position of the first display, generating one or more additional electrical signals for moving the first display from the third position of the first display to the second position of the first display.

11. The head-mounted display device of claim 1, further comprising:
    a second driver in communication with the second electronic controller and the second stepper motor and configured to receive the one or more electrical signals generated by the second electronic controller and provide a predefined pattern of driver signals to the second stepper motor according to the one or more electrical signals generated by the second electronic controller for causing the second stepper motor to move the second display from the first position of the second display to the second position of the second display.

12. The head-mounted display device of claim 1, wherein: the second electronic controller is configured to generate one or more second electrical signals in response to determining that the one or more electrical signals generated by the second electronic controller satisfy a threshold, including limiting the one or more second electrical signals and/or limiting a rate of change of the one or more second electrical signals.

13. The head-mounted display device of claim 1, wherein the second electronic controller is configured to generate the one or more electrical signals in response to determining that a difference between the first position of the second display and the second position of the second display satisfies a threshold.

14. The head-mounted display device of claim 1, wherein the second electronic controller is further configured to:
determine a third position of the second display after the second stepper motor attempts to move the second display from the first position of the second display to the second position of the second display, the third position of the second display being different from the first and second positions of the second display;
determine whether the third position of the second display is within a predefined distance from the second position of the second display; and
in accordance with determining that the third position of the second display is not within the predefined distance from the second position of the second display, generate one or more additional electrical signals for moving the second display from the third position of the second display to the second position of the second display.

15. The method of claim 6, further comprising:
determining a third position of the second display after the second stepper motor attempts to move the second display from the first position of the second display to the second position of the second display, the third position of the second display being different from the first and second positions of the second display;
determining whether the third position of the second display is within a predefined distance from the second position of the second display; and
in accordance with determining that the third position of the second display is not within the predefined distance from the second position of the second display, generating one or more additional electrical signals for moving the second display from the third position of the second display to the second position of the second display.

16. A head-mounted display device, comprising:
a first display configured to provide first light;
a first lens positioned to receive the first light provided by the first display;
a first stepper motor mechanically coupled to the first lens and configured to move the first lens;
a first electronic controller configured to:
determine a first position of the first lens;
receive information identifying a second position of the first lens away from a plane defined by the first lens at the first position of the first lens; and
generate one or more electrical signals for moving the first lens from the first position of the first lens to the second position of the first lens;
a second display distinct and separate from the first display, wherein the second display is configured to provide second light;
a second lens positioned to receive the second light provided by the second display;
a second stepper motor distinct and separate from the first stepper motor, mechanically coupled to the second lens, and configured to move the second lens independently of the first lens; and
a second electronic controller configured to:
determine a first position of the second lens;
receive information identifying a second position of the second lens away from a plane defined by the second lens at the first position of the second lens; and
generate one or more electrical signals for moving the second lens from the first position of the second lens to the second position of the second lens.

17. The head-mounted display device of claim 16, further comprising:
a driver in communication with the first electronic controller and the first stepper motor and configured to receive the one or more electrical signals and provide a predefined pattern of driver signals to the first stepper motor according to the one or more electrical signals for causing the first stepper motor to move the first lens from the first position of the first lens to the second position of the first lens.

18. The head-mounted display device of claim 16, wherein:
the first electronic controller is configured to generate one or more second electrical signals in response to determining that the one or more electrical signals satisfy a threshold, including limiting the one or more second electrical signals and/or limiting a rate of change of the one or more second electrical signals.

19. The head-mounted display device of claim 16, wherein the first electronic controller is configured to generate the one or more electrical signals in response to determining that a difference between the first position of the first lens and the second position of the first lens satisfies a threshold.

20. The head-mounted display device of claim 16, wherein the first electronic controller is further configured to:
determine a third position of the first lens after the first stepper motor attempts to move the first lens from the first position of the first lens to the second position of the first lens, the third position of the first lens being different from the first and second positions of the first lens;
determine whether the third position of the first lens is within a predefined distance from the second position of the first lens; and
in accordance with determining that the third position of the first lens is not within the predefined distance from the second position of the first lens, generate one or more additional electrical signals for moving the first lens from the third position of the first lens to the second position of the first lens.

* * * * *